(12) United States Patent
Matsumoto et al.

(10) Patent No.: US 7,640,005 B2
(45) Date of Patent: Dec. 29, 2009

(54) INFORMATION PROTECTION SYSTEM FOR MOBILE TERMINAL DEVICE, INFORMATION PROTECTION METHOD FOR MOBILE TERMINAL DEVICE, CONTROL PROGRAM, COMPUTER-READABLE MEDIUM AND ELECTRONIC INFORMATION DEVICE

(75) Inventors: Masaru Matsumoto, Higashihiroshima (JP); Hiroshi Tanaka, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 466 days.

(21) Appl. No.: 11/405,481

(22) Filed: Apr. 18, 2006

(65) Prior Publication Data

US 2006/0234679 A1 Oct. 19, 2006

(30) Foreign Application Priority Data

Apr. 19, 2005 (JP) .............................. 2005-121448

(51) Int. Cl.
*H04M 1/66* (2006.01)

(52) U.S. Cl. ................. 455/411; 455/410; 455/419; 455/420; 455/422.1

(58) Field of Classification Search ................. 455/411, 455/410, 419, 420, 422.1
See application file for complete search history.

(56) References Cited

U.S. PATENT DOCUMENTS

| | | | | |
|---|---|---|---|---|
| 5,887,253 | A * | 3/1999 | O'Neil et al. ............... | 455/418 |
| 6,741,851 | B1 * | 5/2004 | Lee et al. .................... | 455/410 |
| 2003/0055733 | A1 * | 3/2003 | Marshall et al. ............... | 705/24 |
| 2004/0023665 | A1 * | 2/2004 | Simmonds et al. ........ | 455/456.1 |
| 2005/0130728 | A1 * | 6/2005 | Nguyen et al. ................ | 463/16 |
| 2005/0153742 | A1 * | 7/2005 | Choi .......................... | 455/558 |

FOREIGN PATENT DOCUMENTS

| | | |
|---|---|---|
| JP | 8-251660 A | 9/1996 |
| JP | 10-177525 | 6/1998 |
| JP | 2001-359157 A | 12/2001 |
| JP | 2005-39587 A | 2/2005 |

OTHER PUBLICATIONS

Japanese Office Action mailed May 26, 2008 in corresponding Japanese application 2005-121448.

* cited by examiner

*Primary Examiner*—Joseph H Feild
*Assistant Examiner*—Huy D Nguyen
(74) *Attorney, Agent, or Firm*—Nixon & Vanderhye P.C.

(57) ABSTRACT

An information protection system for a mobile terminal device, the information protection system including: an authentication device for performing a person authentication process when an information protection request for the mobile terminal device is issued in order to identify whether any person being subjected to authentication is an owner of the mobile terminal device by using a personal identity information, the mobile terminal device being capable of performing a predetermined information protection process in accordance with a remote operation information; and a management device for generating the remote operation information in order to perform an information protection process for the mobile terminal device and for transmitting the remote operation information to the mobile terminal device when the person authentication process by the authentication process device matches the personal identity information.

43 Claims, 11 Drawing Sheets

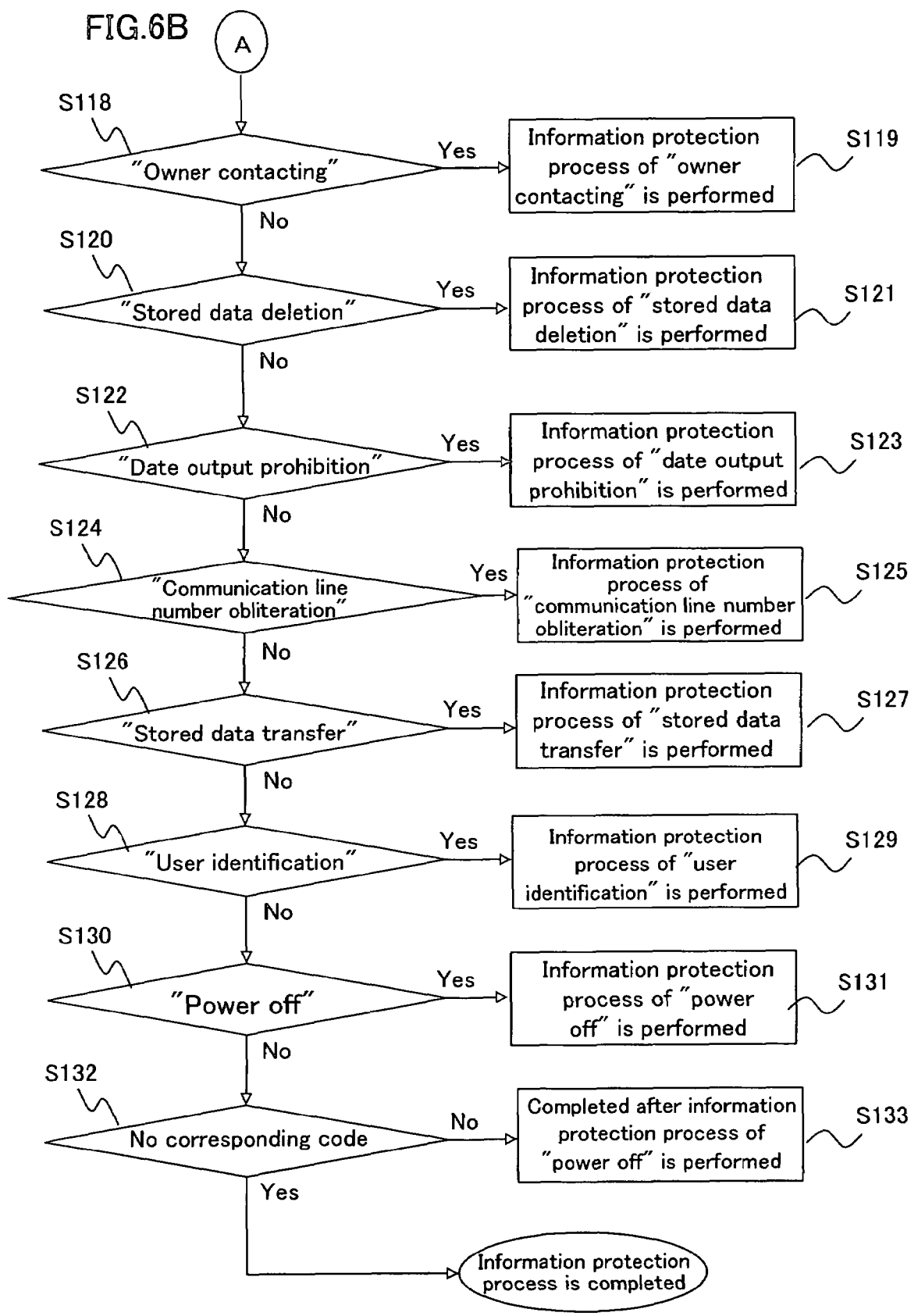

INFORMATION PROTECTION SYSTEM FOR MOBILE TERMINAL DEVICE, INFORMATION PROTECTION METHOD FOR MOBILE TERMINAL DEVICE, CONTROL PROGRAM, COMPUTER-READABLE MEDIUM AND ELECTRONIC INFORMATION DEVICE

This Nonprovisional application claims priority under 35 U.S.C. §119(a) on Patent Applications No. 2005-121448 filed in Japan on Apr. 19, 2005, the entire contents of which are hereby incorporated by reference.

BACKGROUND

1. Technical Field

The technical filed of this disclosure relates to: an information protection system for a mobile terminal device having, thereon, an information protection process function in order to enhance the security of information in the mobile terminal device when it is stolen or lost, the mobile terminal device being a data process terminal device including a communication means (e.g., PHS (Personal Handyphone System; i.e., cellular mobile phone developed in Japan) and a mobile telephone device); an information protection method for the terminal mobile device; a control program having each process procedure written thereon for causing a computer to execute the method; a computer-readable medium having the control program written thereon; and an electric information device capable of executing the method by reading the control program from the computer-readable medium.

2. Description of the Related Art

At present, a mobile terminal device (e.g., mobile telephone device) is brought outside for use in an unspecified wide area due to its feature (size). A mobile terminal device (e.g., PHS or data process terminal device), which is registered to a communication line, has been widely used as a computer peripheral terminal device used for a digital signal information and at the same time, the area in which it is brought out for use has begun widening. Furthermore, a method to use the mobile terminal device is easy and is demanded by numerous people. Still further, because of the multi-functionality of recent mobile terminal devices, memory with a large capacity and camera-function are mounted thereon. Thus, owners thereof can register information of numerous people in a telephone book and hold a large amount of e-mails, camera data and the like.

However, as described above, since the owner of the conventional mobile terminal device can bring the mobile terminal device outside and easily carry it for use, there are many possibilities that the mobile terminal device is stolen or lost. When the stolen or lost mobile terminal device is picked up by a third person, there is a possibility that the mobile terminal device will be easily used by the third person. Thus, a problem occurs that the owner of the mobile terminal device will incur damages, for example, valuable personal information (e.g., telephone book, e-mail and camera data), a variety of information, important data and the like are looked at without consent.

Therefore, the consciousness level on the security for mobile terminal device on the owner's side has been increasing. Thus, an information protection system for the mobile terminal device is needed. In order to solve such a problem when the mobile terminal device is stolen or lost, a variety of information protection methods for the mobile terminal device have been proposed in the past.

For example, all the pre-designated models of a mobile terminal device have a remote lock function mounted thereon, which is as disclosed in Reference 1. The remote lock function has a mechanism that sends a ring signal to a lost mobile terminal device using a telephone number which has been previously registered to pre-designated mobile terminal device for information protection and performs the information protection for the mobile terminal device by performing a predetermined number of sending.

FIG. 9 is a flowchart for explaining a process procedure for the remote lock function in Reference 1. In FIG. 9, a case in which the pre-designated number of times of ring signals is three will be described As shown in FIG. 9, a ring signal is sent to a lost mobile terminal device side based on a telephone number which has been previously registered to a pre-designated mobile terminal device. In step S91, the number of first-time received ring signals is counted. In step S92, it is determined whether the number of the count is identified as the number of previously set first-time ring signals. In step S92, when it is determined as "NO", the process returns to step S91, and on the other hand, when it is determined as "YES", the process proceeds to the next step S93.

In step S93, the number of second-time received ring signals is counted. In step S94, it is determined whether the number of the count is identified as the number of previously set second-time ring signals. In step S94, when it is determined as "NO", the process returns to step S91, and on the other hand, when it is determined as "YES", the process proceeds to the next step S95.

In step S95, the number of third-time received ring signals is counted. In step S96, it is determined whether the number of the count is identified as the number of previously set third-time ring signals. In step S96, when it is determined as "NO", the process returns to step S91, and on the other hand, when it is determined as "YES", the process proceeds to the next step S97.

In step S97, an information protection system is initiated. In step S98, an information protection process is performed by the information protection system.

According to this conventional technique, when a stolen or lost mobile terminal device receives a pattern of the number of ring signals which has been previously input and accumulated and stored in a storage means, a predetermined information protection process is performed, thereby eliminating the possibility that the owner of the stolen or mobile terminal device will incur damages, for example, an individual information or other important data will be looked at without consent. However, when the person, which has picked up the stolen or lost mobile terminal device, responses with a pattern of the number of the ring signals previously set, or when a situation is occurring, in which it is impossible to communicate with the stolen or lost mobile terminal device at the time when the ring signals are sent thereto, the predetermined information protection process cannot be performed. In order to solve this problem, for example, Reference 2 discloses a "protection system for a mobile-type electronic device".

Reference 2 discloses an information protection system capable of protecting information in a stolen or lost mobile terminal device in a manner such that the owner of the stolen or lost mobile terminal device sends a keyword data or a remote operation data to the stolen or lost mobile terminal device by directly using a communication means (e.g., public telephone device or mobile telephone device).

FIG. 10 is a flowchart for explaining the process procedure by a protection system for a mobile terminal device in Reference 2.

As shown in FIG. 10, in step S101, the owner of the mobile terminal device inputs a remote operation data in order to start the communication with the mobile terminal device belonging to the owner by using such as a personal computer or a push-button telephone. In this case, the owner of the mobile terminal device selects the contents of the remote operation data depending on the importance of the information stored in the mobile terminal device and sends it. The contents of the remote operation data indicate the contents of the information protection. As selectable items, for example, prohibition of outputting a stored data, transfer of the stored data and deletion of the stored data are shown. A keyword data is input in the remote operation data in order to perform an information protection that is only known by the owner of the mobile terminal device.

In step S102, the input remote operation data is transferred to a base station of the mobile terminal device via a public or dedicated line network. In step S103, the input remote operation data is transmitted to the lost mobile terminal device via wireless communication from the base station of the mobile terminal device.

When the lost mobile terminal device receives the remote operation data in step S104, it is matched and identified whether the keyword data in the remote operation data is a keyword data which has been previously stored in a storage means by the owner of the stolen mobile terminal device in step S105. When the keyword data does not match each other (NO) in step S105, the lost mobile terminal device waits to receive subsequent data in step S104, ends the information protection process system and returns to a normal mode. When the keyword data matches each other (YES) in step S105, the information protection process system is initiated in step S106, a protection function of the mobile terminal device is activated.

The lost mobile terminal device identifies whether the received remote operation data is a predetermined remote operation data in step S107. When the received remote operation data is not the predetermined remote operation data (NO) in step S107, the lost mobile terminal device waits to receive subsequent data in step S104, ends the information protection process system and returns to the normal mode. When the received remote operation data is the predetermined remote operation data (YES) in step S107, the information protection process is performed in accordance with the contents of the remote operation data in step S108.

According to this conventional technique, the owner himself/herself operates a predetermined information protection means for eliminating the possibility that the owner of the mobile terminal device will incur any damages, by performing a remote operation for an accidental theft or loss of the mobile terminal device, thereby enhancing the security of owner's property or information of the stolen mobile terminal device. As a result, it is possible to easily protect the data in the mobile terminal device. Furthermore, it is possible to avoid a problem of paying the usage charge of the lost mobile terminal device even when any person other than the owner uses the lost mobile terminal device without consent of the owner.

[Reference 1] http:///www.docomokyushu.co.jp/info/weekly/wd_041006_5.html (as of Jan. 6, 2005)

[Reference 2] Japanese Laid-Open Publication No. 10-177525

SUMMARY

The remote lock function in Reference 1 performs the information protection process in a manner such that the lost mobile terminal device receives a ring signal a pre-designated number of times from a telephone number which has been previously registered for information protection, thereby preventing a third person looking at the information without consent.

However, in a manner as disclosed in Reference 1, the information protection process of the lost mobile terminal device can only be performed from a particular device having a telephone number of the lost mobile terminal device that has been previously registered. Thus, when it takes time for the owner of the lost mobile terminal device to reach the particular device, it takes time to protect the information in the mobile terminal device from the time when the mobile terminal device was stolen or lost. For example, in the case of the mobile terminal device being lost when the owner is away from home, if the telephone number of the lost mobile terminal device is registered to a telephone device at home for information protection, it is impossible to perform an information protection on the lost mobile terminal device unless the owner of the mobile terminal device terminal returns home. Thus, during this time, there is a concern that the data in the lost mobile terminal device may be looked at by a third person without consent.

In an information protection manner as disclosed in Reference 1, there is a possibility that the information protection process for the mobile terminal device is mistakenly performed by a third person. For example, if a public telephone device has been previously registered for information protection, this is effective when the mobile terminal device is lost and the owner of the lost mobile terminal device is away from home. However, if a third person sends a ring signal to the owner's mobile terminal device from the public telephone device and the owner of the mobile terminal device is in a situation of not being capable of responding to the sent ring signal, it can be easily assumed that the third person repeatedly re-sends the ring signal to the owner's mobile terminal device from the public telephone device. Accordingly, when the number of the ring signal sent by the third person reaches the pre-designated number of times of the ring signal, the information protection process is performed by the owner's mobile terminal device without the intention of the third person. Thus, even when the owner has not lost the mobile terminal device, there is a concern that the mobile terminal device is disabled by the information protection process.

Furthermore, in the information protection manner as disclosed in Reference 1, labor is required for the owner of the lost mobile terminal device to repeatedly send a ring signal to the lost mobile terminal device from the particular telephone device which is registered for information protection until the information in the stolen or lost mobile terminal device is protected. For example, when the lost mobile terminal device is located out of radiowave range, it is impossible for the lost mobile terminal device to receive a ring signal from the particular telephone device which is registered for information protection even when the ring signal is sent to the lost mobile terminal device. It is necessary for the owner of the lost mobile terminal device to repeatedly send the ring signal until it is confirmed that the lost mobile terminal device has received the ring signal and has performed the information protection process. Furthermore, a large amount of labor and time are required when sending is performed until the lost mobile terminal device receives the ring signal the pre-designated number of times.

In contrast, an information protection system of the mobile terminal device disclosed in Reference 2 can perform an information protection process for a stolen or lost mobile terminal device in a manner such that the owner of the stolen or lost mobile terminal device sends a remote operation data including a keyword data to the stolen or lost mobile terminal device by directly using a communication means (e.g., public telephone device or mobile telephone device). In this information protection manner, it is possible to perform the information protection on the mobile terminal device from devices (including a personal computer) other than the particular telephone device having a remote lock function disclosed in Reference 1.

However, in the information protection manner disclosed in Reference 2, it is easy to perform the information protection process on the mobile terminal device from existing communication means. Therefore, there is an extremely high risk that the remote operation is misused by a third person. For example, when a third person with an ill intention randomly generates a keyword data by using a personal computer and selects the contents of the information protection "deletion of stored data" so as to send a large amount thereof as a remote operation data to the mobile terminal device, there is a concern that any one of arbitrary data is identified as the keyword data and the information protection process is performed on the terminal mobile device without the consent of the owner of the mobile terminal device, and the valuable stored data in the mobile terminal device is deleted without the owner of the mobile terminal device being aware of it.

In the information protection manner disclosed in Reference 2, there is a high possibility that the owner of the mobile terminal device neither remembers a keyword data nor a method for sending a remote operation data in order to perform the information protection process when the mobile terminal device is stolen or lost.

Furthermore, in the information protection manner in Reference 2, a method of how to handle a situation when the mobile terminal device cannot receive a remote operation data from a base station has not been clearly described. For example, in an information protection system with which the base station sends the remote operation data once, when the lost mobile terminal device is located out of radiowave range, it is impossible for the lost mobile terminal device to receive a remote operation data. Therefore, labor and time are required when the owner of the lost mobile terminal device repeatedly creates and sends the remote operation data until it is confirmed that the lost mobile terminal device has received the remote operation data and has performed the information protection process.

One or more embodiments of the present invention address the problems described above and others. An aspect of the present invention provides: an information protection system for a mobile terminal device capable of positively eliminating the possibility that the owner of the lost mobile terminal device will incur any damages with a small amount of labor and time even if the owner of the lost mobile terminal device neither remembers a keyword data nor a method for sending a remote operation data in order to perform an information protection process when the mobile terminal device is stolen or lost; an information protection method for the terminal mobile device; a control program having each process procedure written thereon for causing a computer to execute the method; a computer-readable medium having the control program written thereon; and an electric information device capable of executing the method by reading the control program from the computer-readable medium.

An embodiment of an information protection system for a mobile terminal device includes: an authentication device for performing a person authentication process when an information protection request for the mobile terminal device is issued in order to identify whether any person being subjected to authentication is an owner of the mobile terminal device by using a personal identity information, the mobile terminal device being capable of performing a predetermined information protection process in accordance with a remote operation information; and a management device for generating the remote operation information in order to perform an information protection process for the mobile terminal device and for transmitting the remote operation information to the mobile terminal device when the person authentication process by the authentication process device matches the personal identity information, thereby the objective described above being achieved.

Preferably, in an embodiment of an information protection system for a mobile terminal device, the authentication device includes: a connection section capable of being connected to a communication section at a contactor's side; an authentication section for performing the person authentication process when the information protection request is connected by the connecting section in order to identify whether the contactor is the owner of the mobile terminal device by using the personal identity information; and an instruction output section for outputting an information protection process instruction to the management device when the person authentication process matches the personal identity information.

Furthermore, preferably, in an embodiment of an information protection system for a mobile terminal device, when the information protection request is issued, the information protection request being connected to the communication section on the contactor's side by the connection section, the authentication section compares: the personal identity information, provided by the contactor who responds to a question to the contactor's side by using key numbers of the communication section, the question being issued through the communication section, and the question relates to at least one of a birth data or a PIN number, with the personal identity information previously stored so as to perform the person authentication process in order to identify whether the personal identity information matches each other.

Still further, preferably, in an embodiment of an information protection system for a mobile terminal device, the management device includes: a connection section capable of receiving the information protection process instruction; a remote operation information generation section for generating the remote operation information when the information protection process instruction is received by the connection section in order to perform the information protection process for the mobile terminal device; and a remote operation information transmission section for transmitting the remote operation information generated by the remote operation information generation section to the mobile terminal device.

Still further, preferably, in an embodiment of an information protection system for a mobile terminal device, the management device transmits the remote operation information to the mobile terminal device via a relay base station.

Still further, preferably, in an embodiment of an information protection system for a mobile terminal device, the management device includes: a management section for managing a communication status with the mobile terminal device; and a confirmation section for confirming whether the mobile terminal device has received the remote operation information based on the communication status managed by the management section, wherein the management section performs a re-transmission of the remote operation information to the mobile terminal device when the confirmation section cannot confirm the receipt of the remote operation information at the mobile terminal device.

Still further, preferably, in an embodiment of an information protection system for a mobile terminal device, the management device includes a management section for managing a communication status between the mobile terminal device and the relay base station, wherein the relay base station includes a confirmation section for confirming whether the mobile terminal device has received the remote operation information, wherein when the confirmation section cannot confirm the receipt of the remote operation information at the mobile terminal device, the confirmation section transmits the information that the confirm section has not confirmed to the management section in the management device from the relay base station, and the management device performs a re-transmission of the remote operation information to the mobile terminal device.

Still further, preferably, in an embodiment of an information protection system for a mobile terminal device, the management device further includes a storage section for storing a protection mode information and a protection process information, the protection mode information and the protection process information being predetermined between the management device and the mobile terminal device, wherein the remote operation information generation section generates the remote operation information based on the protection mode information and the protection process information.

Still further, preferably, in an embodiment of an information protection system for a mobile terminal device, the mobile terminal device includes: a receiving section for receiving the remote operation information to be transmitted; an identification section for identifying the received remote operation information; and an information protection process section for performing the predetermined information protection process in accordance with the remote operation information based on the identification result by the identification section.

Still further, preferably, in an embodiment of an information protection system for a mobile terminal device, the mobile terminal device further includes a storage section for storing a predetermined information, the predetermined information being predetermined between the mobile terminal device and the management device.

Still further, preferably, in an embodiment of an information protection system for a mobile terminal device, the identification section includes: a protection mode information identification section for identifying whether a protection mode information stored as the predetermined information in the storage section matches a protection mode information in the remote operation information; and a protection process information identification section for identifying whether a protection process information stored as a predetermined information in the storage section matches a protection process information in the remote operation information.

Still further, preferably, in an embodiment of an information protection system for a mobile terminal device, the storage section includes: a first storage section for storing a protection mode information and a protection process information; a second storage section for storing the remote operation information received by the receiving section; and a third storage section for storing a state after the information protection process is performed by the information protection process section, the information protection process being performed after a match between the protection mode information stored in the first storage section and the protection mode information stored in the second storage section is confirmed by the identification section.

Still further, preferably, in an embodiment of an information protection system for a mobile terminal device, the information protection process section performs the predetermined information protection process in order to eliminate the possibility that the owner of the mobile terminal device will incur any damages based on the identification result of the transmitted remote operation information when the mobile terminal device is stolen or lost.

Still further, preferably, in an embodiment of an information protection system for a mobile terminal device, the information protection process section performs the predetermined information protection process in order to eliminate the possibility that any person who has sent a ring signal to the owner of the mobile terminal device will incur any damages based on the identification result of the transmitted remote operation information when the mobile terminal device is stolen or lost.

Still further, preferably, in an embodiment of an information protection system for a mobile terminal device, the information protection process section performs at least one of the following information protection processes:

(1) an information protection process of "power off" which stops the original functions of the stolen or lost mobile terminal device such that any person other than the owner cannot use the mobile terminal device;

(2) an information protection process of "warning generation" which generates an alarm to a visual sense or a hearing sense when the any person other than the owner uses the stolen or lost mobile terminal device;

(3) an information protection process of "message display" which displays, on a predetermined display section, a contact address or a message previously input by the owner and stored in the storage section so as to recover the mobile terminal device when the any person other than the owner uses the stolen or lost mobile terminal device;

(4) an information protection process of "owner contacting" which stops the original functions of the stolen or lost mobile terminal device so as to perform a communication process only to the contact address previously input by the owner and stored in the storage section;

(5) an information protection process of "sending function prohibition" which performs a stopping process on at least one of the original functions, previously input by the owner, of the stolen or lost mobile terminal device;

(6) an information protection process of "data output prohibition" which prohibits a data output from the storage section in the stolen or the lost mobile terminal device;

(7) an information protection process of "stored data deletion" which deletes data from the storage section in the stolen or the lost mobile terminal device such that any person other than the owner cannot see and use the data;

(8) an information protection process of "communication line number obliteration" which obliterates a communication line number of the stolen or lost mobile terminal device such that the any person other than the owner cannot use the communication line number;

(9) an information protection process of "stored data transfer" which transfers a stored data from the storage section in the stolen or lost mobile terminal device to another predetermined electronic device so as to recover the stored data; and

(10) an information protection process of "user identification" which identifies a user using the mobile terminal device by the identification section such that the any person other than the owner cannot use the mobile terminal device.

Still further, preferably, in an embodiment of an information protection system for a mobile terminal device, the information protection process section performs at least one of the following information protection processes:

(1) an information protection process of transmitting a predetermined information to any person, who has sent a ring signal to the mobile terminal device, that the owner of the mobile terminal device is in a situation of not being able to receive;

(2) an information protection process of stopping a function of receiving an information being received from the any person who has sent a ring signal to the mobile terminal device;

(3) an information protection process of transmitting data used during a call or when in use to the any person who has sent a ring signal to the mobile terminal device;

(4) an information protection process of stopping a function of transmitting an information being transmitted to the any person who has sent a ring signal to the mobile terminal device;

(5) an information protection process of transmitting a loss message, previously input by the owner of the mobile terminal device and stored in the storage section, to the any person who has sent a ring signal to the mobile terminal device; and (6) an information protection process of preventing the any person, who has sent a ring signal to the mobile terminal device, from using the information protection system of the mobile terminal device.

Still further, preferably, an information protection system for a mobile terminal device according to the present invention, wherein the communication section is a mobile telephone device or a public telephone device.

Still further, preferably, in an example information protection method for a mobile terminal device, the method causing an information protection system to perform the following based on a computer control program: an authentication step of performing a person authentication process when an information protection request for the mobile terminal device is issued; and a management step of generating a remote operation information and transmitting the remote operation information to the mobile terminal device when the person authentication process matches a personal identity information.

An information protection method for a mobile terminal device, the mobile terminal device performing an information protection process by using the information protection system for the mobile terminal device described above, the method causing a server to perform the following based on a computer control program: an authentication step of performing a person authentication process when an information protection request for the mobile terminal device is issued from a communication section at a contactor's side; and a management step of generating a remote operation information and transmitting the remote operation information to the mobile terminal device when the person authentication process matches a personal identity information, the method causing the mobile terminal device to perform the following based on the computer control program: an identification step of receiving the remote operation information from the server and identifying the received remote operation information; and a step of performing a predetermined information protection process in accordance with the remote operation information based on the identification result in the identification step, thereby the objective described above being achieved.

Preferably, in an example information protection method for a mobile terminal device, the authentication step includes: a step of performing a person authentication process for identifying, by using the personal identity information, whether the contactor is the owner of the mobile terminal device when the information protection request is issued; and an instruction output step of outputting an information protection process instruction when the person authentication process matches the personal identity information.

Furthermore, preferably, in an example information protection method for a mobile terminal device, the management step includes: a remote operation information generation step of generating a remote operation information in order to perform the information protection process for the mobile terminal device when the information protection process instruction is received; and a remote operation information transmission step of transmitting the generated remote operation information to the mobile terminal device.

Still further, preferably, in an example information protection method for a mobile terminal device, the management step includes: a management step of managing a communication status with the mobile terminal device; and a confirmation step of confirming whether the mobile terminal device has received the remote operation device based on the communication status, wherein the management step performs a re-transmission of the remote operation information to the mobile terminal device when the receipt of the remote operation information at the mobile terminal device cannot be confirmed in the confirmation step.

In an information protection method for a mobile terminal device, the method causes an information protection system to perform the following based on a computer control program: an identification step of receiving a remote operation information and identifying the received remote operation information; and a step of performing a predetermined information protection process in accordance with the remote operation information based on the identification result in the identification step, thereby the objective described above being achieved.

Preferably, in an example information protection method for a mobile terminal device, the identification step includes: a protection mode information identification step of identifying whether a stored protection mode information matches a protection mode information in the remote operation information; and a protection process information identification step of identifying whether a stored protection process information matches a protection process information in the remote operation information.

A control program according to an embodiment causes a computer to perform each step of the example information protection methods for the mobile terminal device described above, thereby the objective described above being achieved.

A computer-readable medium according to an embodiment include the control program described above recorded thereon, thereby the objective described above being achieved.

An embodiment of an electronic information device includes: an authentication section for performing a person authentication process when an information protection request for a mobile terminal device is issued; and a section for generating a remote operation information and transmitting the remote operation information to the mobile terminal device when the person authentication process matches a personal identity information, thereby the objective described above being achieved.

An embodiment electronic information device includes: an identification section for receiving a remote operation information and identifying the received remote operation information; and a section for performing a predetermined information protection process in accordance with the remote operation information based on the identification result by the identification section, thereby the objective described above being achieved.

Owing to the structure described above, the function of one or more embodiments will be described hereinafter.

According to one or more embodiments, when a mobile terminal device is stolen or lost, an information protection request for the mobile terminal device is issued by calling an authentication device by the owner of the mobile terminal device. In the authentication device, a person authentication process is performed in order to identify whether the owner of the mobile terminal device is actually the owner of the mobile terminal device by using a personal identity information. Only when the personal identity information is matched by the person authentication process, an information protect instruction is issued to a management device.

In the management device, when the information protection instruction is received from the authentication device, a unique remote operation information (remote operation packet) is generated in order to perform an information protection process for the mobile terminal device and then, the remote operation information is transmitted to a relay base station.

In the relay base station, when the remote operation packet is received from the management device, the remote operation packet is transmitted to the lost mobile terminal device, for example, via wireless communication.

In the mobile terminal device, the remote operation packet is received at a receiving means, and the remote operation packet is identified at an identification means. Furthermore, only when the identification result matches an internally stored information, an information protection process is performed by an information protection means in accordance with the contents of the remote operation packet, thereby eliminating the possibility that the owner of the mobile terminal device will incur any damages.

As described above, a predetermined information protection process is performed for eliminating the possibility that the owner of the mobile terminal device will incur any damages in a manner such that the owner performs a remote operation, using a remote operation information, against the theft or loss of the mobile terminal device, thereby enhancing the security of the owner's property or information of the stolen mobile terminal device.

Even if the owner of the mobile terminal device does not remember a keyword data or a method for sending a remote operation data in order to perform an information protect process as required by conventional manners, it is possible to immediately eliminate the possibility that the owner of the stolen or lost mobile terminal device will incur any damages by simply calling an authentication device by the owner so as to issue an information protection request. The contacting means to the authentication device is commonly-used and it is considered that the owner of the mobile terminal device is aware of the functions of the contacting means (such as entering key numbers according to a telephone voice guide) at the time when the mobile terminal device is stolen or lost. Thus, it is possible to immediately perform the information protection process for the mobile terminal device without causing any time-lag as occurred in the conventional manners until the information protection process for the mobile terminal device is performed from when the mobile terminal device is stolen or lost.

The person authentication process is performed at the authentication device whether the owner of the mobile terminal device is actually the owner of the mobile terminal device, thereby preventing a third person other than the owner of the mobile terminal device from performing the information protection process.

Furthermore, there is no risk that an erroneous information protection process is performed by a remote operation information (a remote operation packet) from a user of a commonly-used mobile terminal device by utilizing the remote operation packet which is uniquely generated at a management device.

Furthermore, since the management device can grasp a radiowave status between the stolen or lost mobile terminal device and a relay base station, it is possible to automatically and repeatedly make retries until the remote operation packet is positively received at the mobile terminal device. Thus, labor and time are not required when the owner of the mobile terminal device himself/herself repeatedly sends the remote operational packet.

Furthermore, it is possible to select and apply the most appropriate information protection process case by case owing to a protection mode information and protection process information.

Furthermore, when a storage means is provided for storing the state after the information protection process, it is possible to return to the state of information protection before the power is turned off after the information protection process and then resume the state even if the power of the mobile terminal device is turned on again.

These and other advantages will become apparent to those skilled in the art upon reading and understanding the following detailed description with reference to the accompanying figures.

BRIEF DESCRIPTION OF THE DRAWINGS

FIG. 6B is a flowchart for explaining each process procedure (2) in the process performed by the mobile terminal device in the information protection system for the mobile terminal device in FIG. 1.

DESCRIPTION OF THE PREFERRED EMBODIMENTS

Hereinafter, Embodiments of an information protection system for a mobile terminal device according to the present invention will be described in detail with reference to the accompanying drawings.

Figure 1:
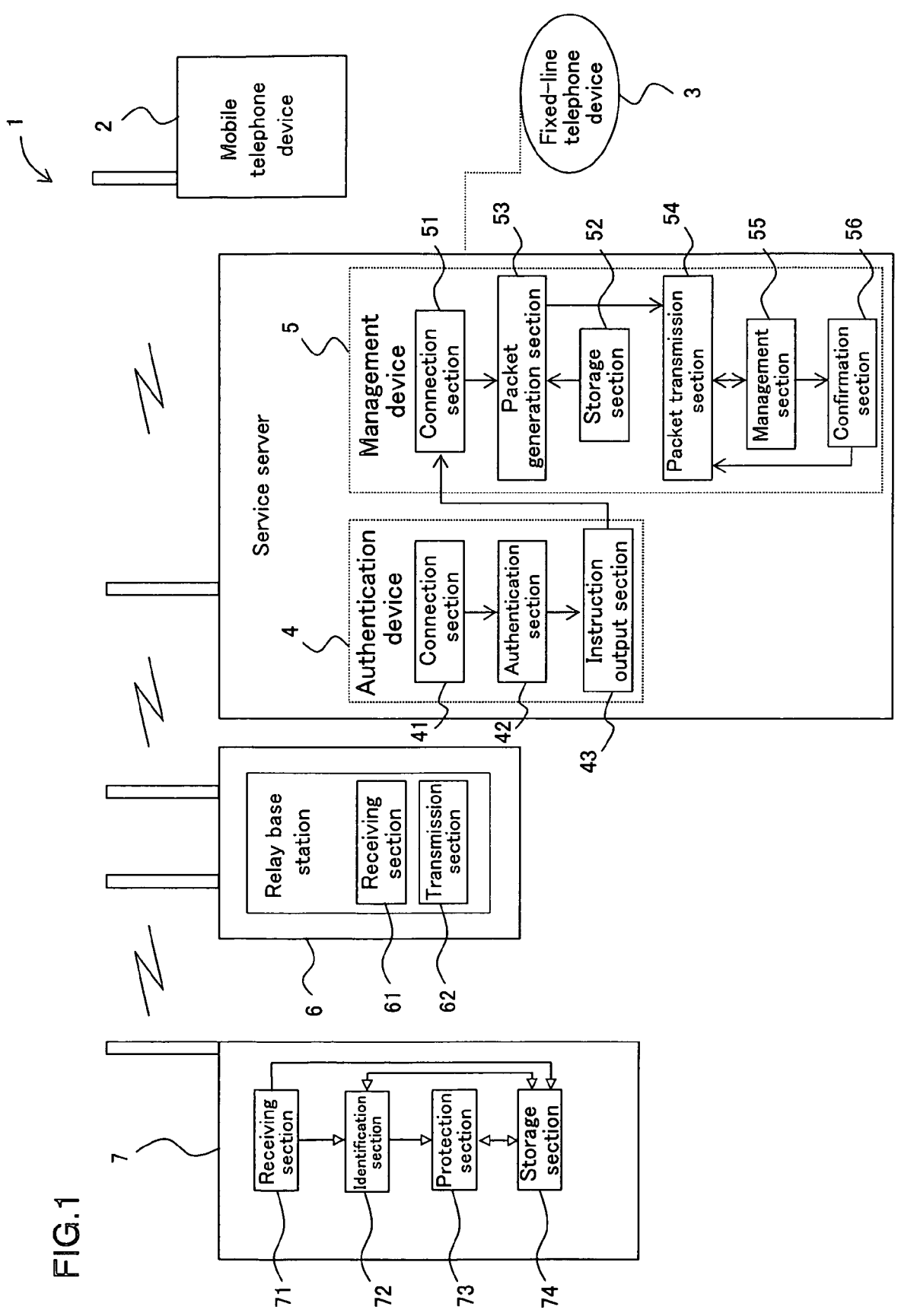
FIG. 1 is a block diagram showing an example of relevant parts of an information protection system for a mobile terminal device according to an Embodiment of the present invention.

FIG. 1 is a block diagram showing an example of relevant parts of an information protection system for a mobile terminal device according to an Embodiment of the present invention.

In FIG. 1, the information protection system 1 for the mobile terminal device includes an authentication device 4, a management device 5, one or more relay base station 6 and a user-side's mobile terminal device 7. The authentication device 4 performs a person authentication process in order to identify whether a contactor from a mobile telephone device 2 or a fixed-line telephone device 3 (including a public telephone device) is the owner of the mobile terminal device. The management device 5 generates a remote operation information (remote operation packet) in order to perform an information protection process. The user-side's mobile terminal device 7 can be connected to the relay base station 6 via radiowave (wireless communication) or wired communication. In FIG. 1, a case in which the authentication device 4 and the management device 5 are provided in a service server provided by a communication carrier is shown. However, this is merely an example. As long as a similar purpose is realized, other methods can be used. Additionally, in FIG. 1, although one relay base station 6 is shown, two or more relay base stations 6 can be included. Furthermore, a case will be described in which the mobile telephone device 2, the fixed-line telephone device 3, the service server, the relay base station 6 and the mobile terminal device 7 are connected to a publicly-used line network (e.g., radiowave communication line and wired communication line). However, the mobile telephone device 2, the fixed-line telephone device 3, the service server, the relay base station 6 and the mobile terminal device 7 can be connected to a satellite link or other communication lines.

A PHS data communication device or a mobile telephone device is used as the mobile telephone device 2. The mobile telephone device 2 is connected to a publicly-used line network (e.g., a wireless communication line).

The fixed-line telephone device 3 is connected to the publicly-used line network (e.g., a wired communication line).

The authentication device 4 includes a connection section 41, an authentication section 42 and an instruction output section 43. The connection section 41 is provided as a connection means (receiving means) for connecting to a user (mobile telephone device 2 or fixed-line telephone device 3) via radiowave or wired connection. The authentication section 42 is provided as an authentication means for performing a person authentication process in order to identify whether a contactor is the owner (user) of the mobile terminal device 7 when an information protection request is received by the connection section 41, and then the information protection request is issued to the mobile terminal device 7. The instruction output section 43 is provided as an instruction output means for outputting an information protection process instruction to the management device 5 when the person authentication process between the contactor and the owner (user) is matched by the authentication section 42.

The management device 5 includes a connection section 51, a storage section 52, a packet generation section 53, a packet transmission section 54, a management section 55 and a confirmation section 56. The connection section 51 is provided as a connection means (instruction receiving section), which is connected to the instruction output section 43 in the authentication device 4 via radiowave or wired connection, for receiving the information protection process instruction. The storage section 52 is provided as a storage means for storing a protection mode information and a protection process information which are predetermined between the management device 5 and the mobile terminal device 7. The packet generation section 53 is provided as a remote operation information generation means for generating a unique remote operation packet by using the protection mode information and the protection process information stored in the storage section 52 in order to perform an information protection process on the mobile terminal device 7 when the information protection process instruction is received at the connection section 51. The packet transmission section 54 is provided as a remote operation information transmission means for transmitting the generated remote operation packet to the relay base station 6 via radiowave or wired connection. The management section 55 is provided as a management means for managing/grasping a radiowave communication status with the mobile terminal device 7 and between one or more relay base station 6 and the mobile terminal device 7, and a radiowave communication status with the mobile terminal device 7. The confirmation section 56 is provided as a confirmation means for confirming whether the mobile terminal device 7 has received the remote operation packet based on the radiowave communication status provided by the management section 55.

The relay base station 6 includes a receiving section 61 and a transmission section 62. The receiving section 61 is provided as a receiving means for receiving the remote operation packet from the management device 5. The transmission section 62 is provided as a transmission means for transmitting the received remote operation packet to the mobile terminal device 7.

The mobile terminal device 7 is, for example, a PHS (Personal Handyphone System) data communication device or a mobile telephone device. The mobile terminal device 7 includes a receiving section 71, an identification section 72, a protection section 73 and a storage section 74. The receiving section 71 is provided as a receiving means for receiving the remote operation packet which is transmitted from the relay base station 6 using, for example, radiowave as a transmission medium. The identification section 72 is provided as an identification means for identifying the remote operation packet received at the receiving section 71. The protection section 73 is provided as an information protection process means for performing a predetermined information protection process in accordance with the remote operation packet. The predetermined information protection process is performed based on the identification result by the identification section 72 in order to eliminate the possibility that the owner of the mobile terminal device 7 will incur any damages. The storage section 74 is provided as a storage section for storing: the protection mode information and the protection process information used by the identification section 72 for identification which are predetermined between the management device 5 and the storage section 74; the remote operation packet received by the receiving section 71 via radiowave or wired connection; and the state after the information protection process is performed by the protection section 73.

The identification section 72 includes a protection mode information identification means and a protection process information identification means. The protection mode information identification means identifies whether the protection mode information previously stored in the storage section 74 matches the protection mode information in the remote operation packet. The protection process information identifies whether the protection process information previously stored in the storage section 74 matches the protection process information in the remote operation packet.

Hereinafter, owing to the structure described above, an information protection method for the mobile terminal device employing the information protection system 1 for the mobile terminal device according to the Embodiment will be described.

In the information protection system 1 for the mobile terminal device according to the Embodiment, when an information protection request is issued to the mobile terminal device 7, a person authentication process is performed by the authentication device 4. When the identification is matched in the person authentication process, the remote operation packet is generated by the packet generation section 53 in the management device 5. The remote operation packet is transmitted to the mobile terminal device 7 from the packet transmission section 54 via the relay base station 6, and causes the mobile terminal device 7 to perform a predetermined information protection process, thereby eliminating the possibility that the owner of the mobile terminal device 7 will incur any damages. This will be described with reference to FIG. 2.

Figure 2:
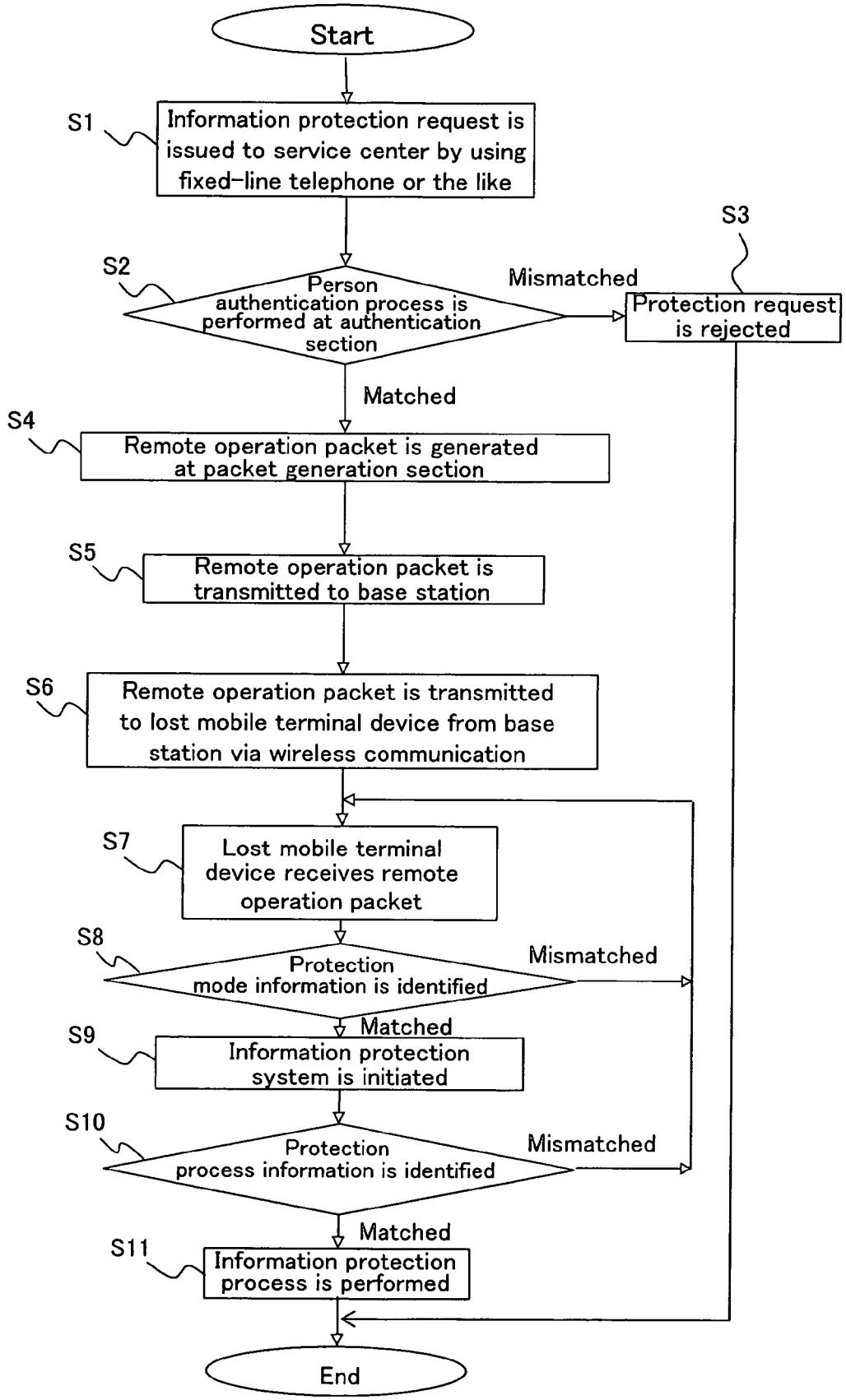
FIG. 2 is a flowchart for explaining each process procedure of the information protection method for the mobile terminal device performed by the information protection system for the mobile terminal device shown in FIG. 1.

FIG. 2 is a flowchart for explaining each process procedure of the information protection method for the mobile terminal device 7 performed by the information protection system 1 for the mobile terminal device 7 according to the Embodiment.

As shown in FIG. 2, first, in step S1, an information protection request is issued to a service server provided by a communication carrier from, for example, the fixed-line telephone device 3 within or outside the city via a publicly-used line network or from, for example, the mobile telephone device 2 via a wireless communication line. In step S2, the person authentication process is performed by the authentication device 4 in order to determine whether the contactor is the owner of the mobile terminal device 7.

Next, when the authentication by the authentication section 42 does not match the personal identity information (mismatched) in step S2, the information protection request from the contactor is rejected in step S3, and the information protection process according to the Embodiment ends. On the other hand, when the authentication by the authentication section 42 matches the personal identity information (matched) in step S2, a remote operation packet is generated in step S4 by the packet generation section 53 in the management device 5 based on: the protection mode information which is predetermined between the management device 5 and the mobile terminal device 7; and the protection process information which is selected by the owner of the mobile terminal device 7.

In step S5, the generated remote operation packet is transmitted to the relay base station 6 by the packet transmission section 54 in the management device 5 via radiowave or the like.

In step S6, when the transmitted remote operation packet is received at the relay base station 6, the received remote operation packet is transmitted to the mobile terminal device 7 from the relay base station 6.

In step S7, the remote operation packet is received by the receiving section 71 in the mobile terminal device 7. In step S8, the identification section 72 determines whether the received remote operation packet matches the predetermined protection mode information which has been previously stored.

Only when a match of the identification result is confirmed by the identification section 72 (YES) in step S8, the information protection process of the information protection system 1 is initiated by the protection section 73 in step S9. Furthermore, in step S10, the protection process information is identified. In step S11, a predetermined information protection process in accordance with the protection process information is performed in order to eliminate the possibility that the owner of the mobile terminal device 7 will incur any damages.

Next, the process by each component in the information protection system 1 for the mobile terminal device 7 according to the Embodiment will be described in detail.

Process operation (steps S1 to S3 in FIG. 2) by the authentication device 4 in FIG. 1 will be described in detail with reference to FIG. 3.

Figure 3:
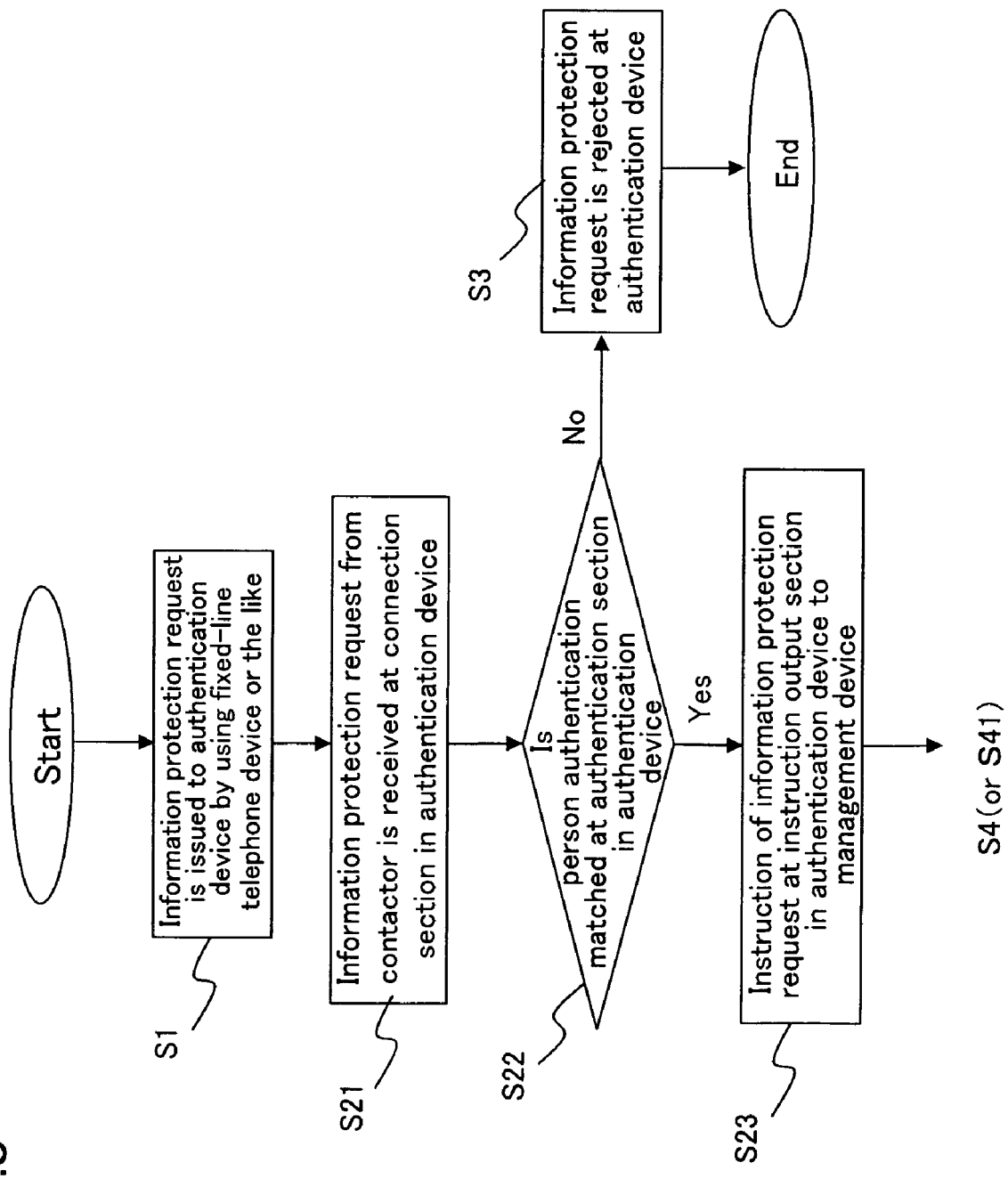
FIG. 3 is a flowchart for explaining a process procedure in the process operation of an authentication device in the information protection system for the mobile terminal device in FIG. 1.

FIG. 3 is a flowchart for explaining a process procedure in further detail in the process operation (steps S1 to S3 in FIG. 2) of the authentication device 4 in the information protection system 1 for the mobile terminal device 7 in FIG. 1.

As shown in FIG. 3, when the owner of the mobile terminal device 7 has lost the mobile terminal device 7, the owner of the mobile terminal device 7, as described above, calls to contact the authentication device 4 of the service server from the mobile telephone device 2 or the fixed-line telephone device 3 in step S1 and issues the information protection request for the lost mobile terminal device 7.

In step S2, the person authentication process is performed after the information protection request is received, which will be described in detail. In step S21, the information protection request for the mobile terminal device 7 is received at the connection section 41 in the authentication device 4. In step S22, the person authentication process is performed by the authentication section 42 in the authentication device 4 in order to identify whether the contactor is the owner (person himself/herself) of the lost mobile terminal device 7 by comparing data which is stored as a personal identity information and answers made by the contactor, by employing some methods (e.g., by automatically making voice questions regarding birth data, address or PIN number (a method, such as answering by entering the PIN number using keys on a telephone to the formulated question)).

When the person authentication process does not match (NO) in step S22, the information protection request issued by the contactor is rejected in step S3, and the information protection process ends. On the other hand, when the person authentication process matches (YES) in step S22, for example, a prohibition of outputting a stored data, a transfer of the stored data or a deletion of the stored data are output, as information protection items requested by the contactor, to the management device 5 by the instruction output section 43 in the authentication device 4 in step S23.

As can be appreciated from the flowchart in FIG. 3, via the authentication device 4, the following effects are obtained:

(1) since the contacting means (e.g., the mobile telephone device 2 and the fixed-line telephone device 3) to the authentication device 4 is commonly-used, it is considered that the owner of the mobile terminal device 7 will be aware of the functions of the mobile telephone device 2 or the fixed-line telephone device 3 (such as entering key numbers according to a telephone voice guide) at the time when the mobile terminal device 7 is stolen or lost. Thus, it is possible to immediately issue the information protection request for the mobile terminal device 7; and (2) it is possible to prevent a third person other than the owner of the mobile terminal device 7 from performing the information protection process by performing the personal identification.

The process operation (steps S4 to S6 in FIG. 2) performed by the management device 5 and the relay base station 6 in FIG. 1 will be described in detail with reference to FIG. 4.

Figure 4:
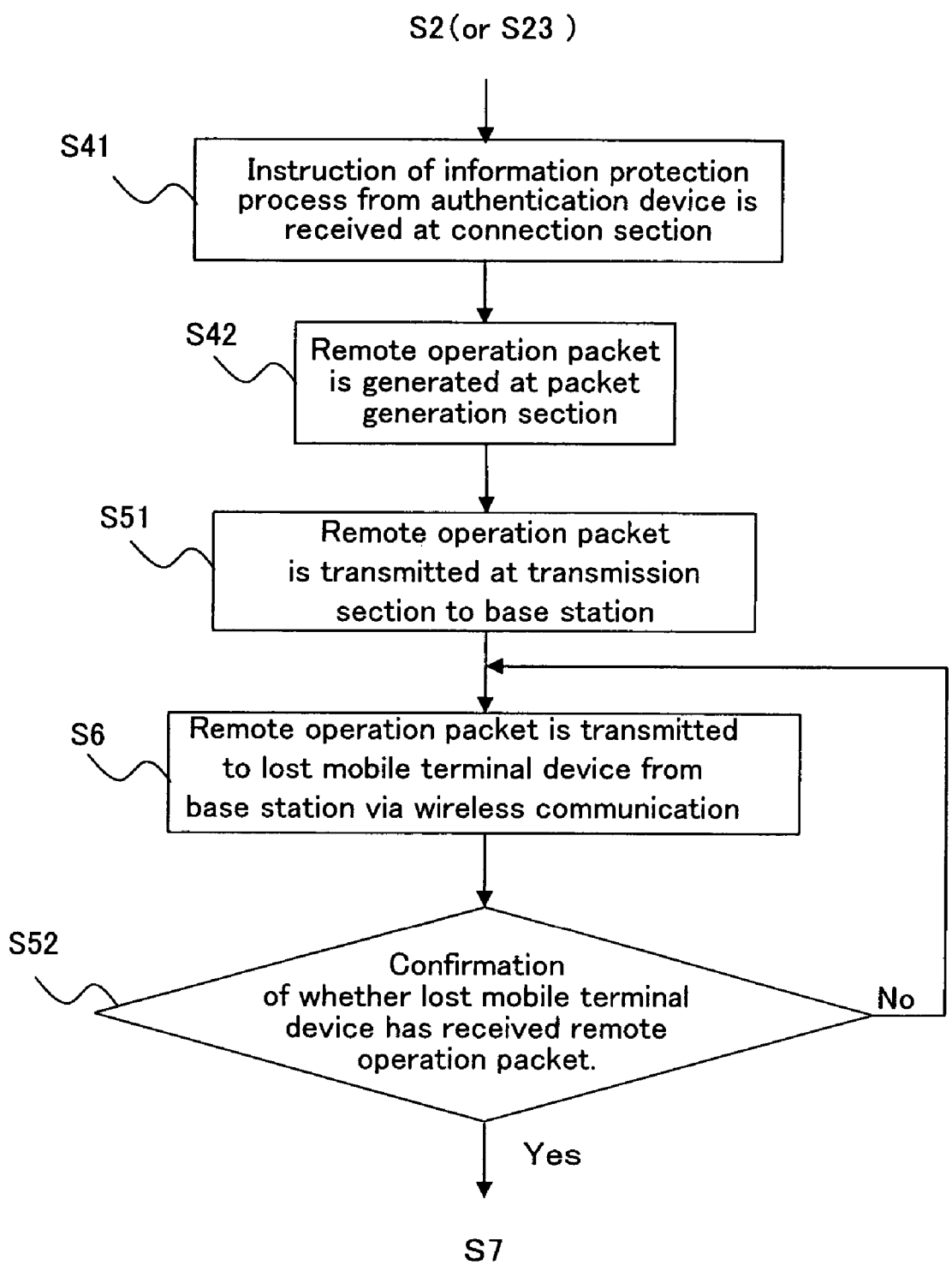
FIG. 4 is a flowchart for explaining a process procedure in the process operation of a management device and a relay base station in the information protection system for the mobile terminal device in FIG. 1.

FIG. 4 is a flowchart for explaining a process procedure in further detail in the process operation (steps S4 to S6 in FIG. 2) of the management device 5 and the relay base station 6 in the information protection system 1 for the mobile terminal device 7 in FIG. 1.

When the information protection process instruction from the authentication device 4 is received at the connection section (instruction receiving section) 51 in the management device 5 in step S41, a remote operation packet in accordance with the information protection process instruction will be generated by the packet generation section 52 in step S42.

Figure 5:
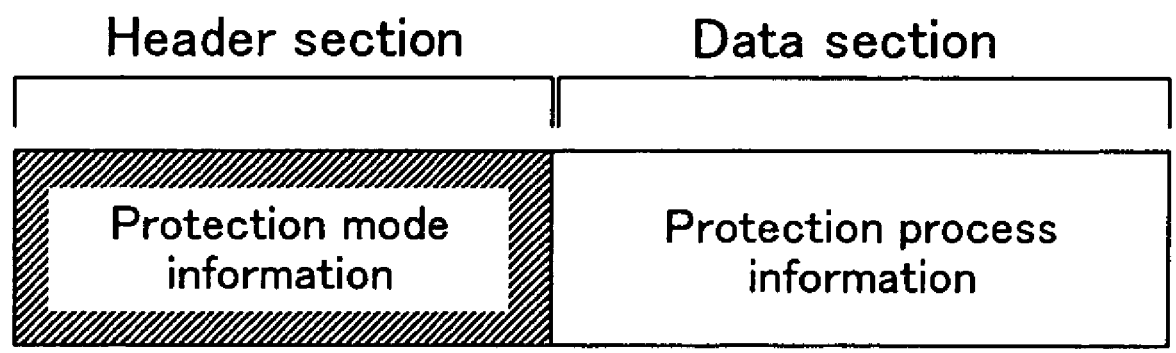
FIG. 5 is a diagram showing a structural example of the remote operation packet in FIG. 4

For example, as shown in FIG. 5, the remote operation packet includes: the protection mode information in a header section, the protection mode information being a header information predetermined between the packet generation section 53 and the mobile terminal device 7 in order to perform the information protection process; and the protection process information in a data section, the protection process information subsequent to the protection mode information. Herein, the protection process information indicates the information protection items selected by the owner of the mobile terminal device 7 for the authentication device 4. As the information protection items, for example, "warning generation", "message display" and "sending function prohibition" are shown. The information protection items will be described later with FIG. 6A and FIG. 6B. The header section and the data section are generated as one remote operation packet. The protection mode information and the protection process information are stored in the storage section 53. The configuration of the remote operation packet shown in FIG. 5 is merely an example. As long as a similar function is realized, other methods can be used.

After the remote operation packet is generated, the remote operation packet is transmitted to the relay base station 6 by the packet transmission section 54 in the management device 5 in step S51, as described above. Furthermore, in step S6, the remote operation packet is transmitted via wireless communication to the lost mobile terminal device 7 from the transmission section 62 in the relay base station 6.

In the management device 5, since the radiowave status (communication status) between the stolen/lost mobile terminal device 7 and the relay base station 6 can be managed/grasped by the management section 55, it is possible to confirm whether the remote operation packet has been received at the mobile terminal device 7 in step S52 and resend the remote operation packet repeatedly by the packet transmission section 54 until the receipt of the remote operation packet is confirmed. However, this resending method is merely an example. As long as a similar objective is achieved, other methods can be used.

As can be appreciated from the flowchart of FIG. 4, by utilizing the remote operation packet uniquely generated by the management device 5, the following effects are obtained:

(1) there is no risk of performing a erroneous information protection process by a packet from users of commonly-used mobile terminal devices as occurred in the past;

(2) it is possible to repeatedly make retries until the mobile terminal device 7 confirms the receipt of the remote operation packet; and (3) labor and time are not required for the owner of the mobile terminal device 7 himself/herself to repeatedly retransmit the remote operation packet.

The information protection process (steps S7 to S11 in FIG. 2) performed by the lost mobile terminal device 7 will be described in detail with reference to FIGS. 6A and 6B.

Figure 6A:
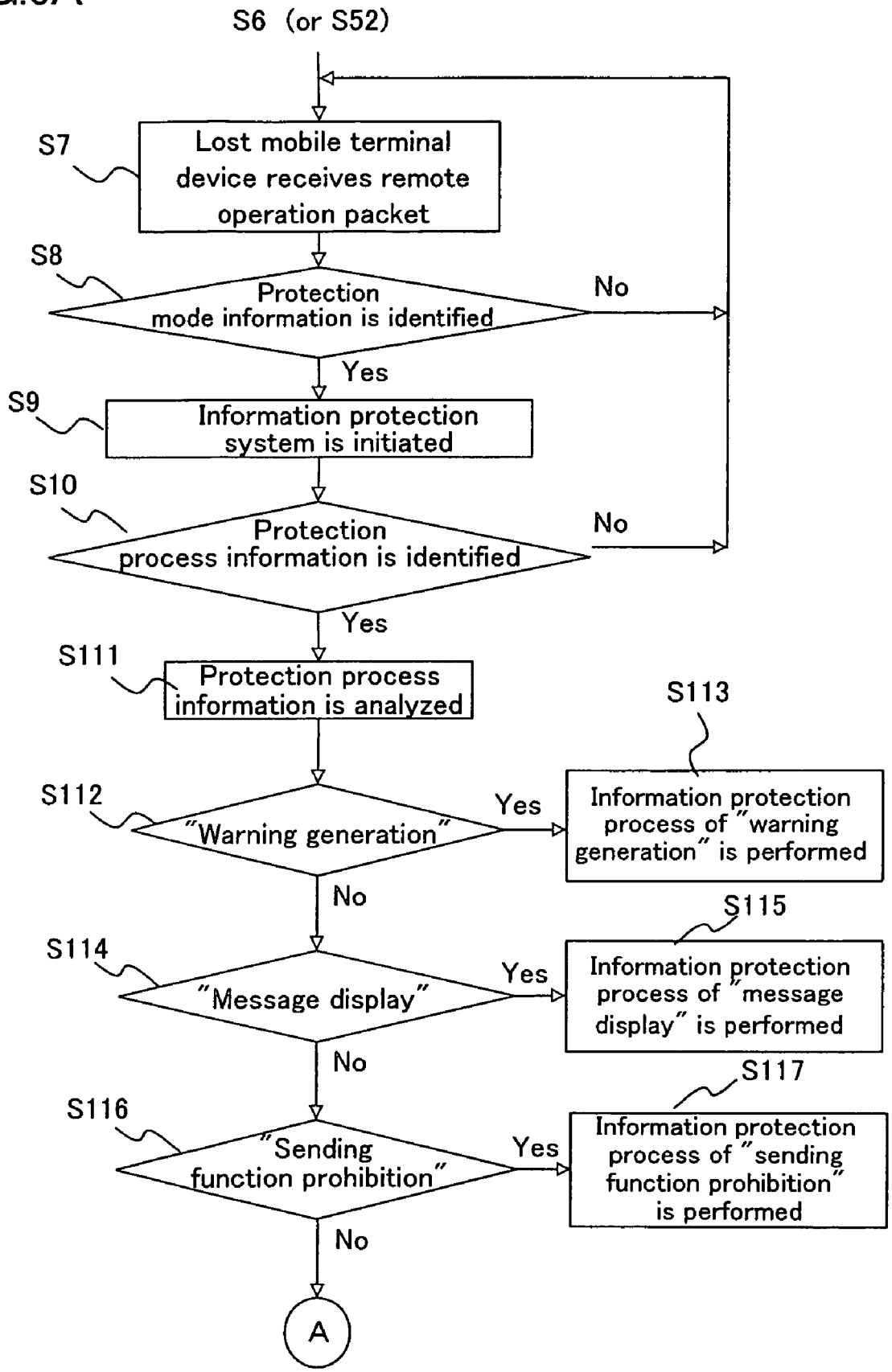
FIG. 6A is a flowchart for explaining each process procedure (1) in the process performed by the mobile terminal device in the information protection system for the mobile terminal device in FIG. 1.

FIGS. 6A and 6B are flowcharts for explaining the process procedure in further detail in each process operation (steps S7 to S11 in FIG. 2) performed by the mobile terminal device 7 in the information protection system 1 for the mobile terminal device 7 in FIG. 1.

As shown in FIG. 6A, as described above, in step S7, the remote operation packet transmitted from the management device 5 to the owner's mobile terminal device 7 via the relay base station 6 is received at the receiving section 71 in the lost mobile terminal device 7. In step S8, the identification section 72 identifies whether the protection mode information in the remote operation packet matches the protection mode information stored in the storage section 74 in the mobile terminal device 7.

When the identification result does not match (NO) in step S8, the mobile device terminal 7 waits for the identification of the protection mode information and then, the information protection process of the information protection process system 1 ends and returns to the normal mode. On the other hand, when it is confirmed (matched) that the identification result is the predetermined protection mode information (YES) in step S8, the information protection process system 1 is initiated in step S9, and the information protection process function is activated by the protection section 73.

In step S10, identification section 72 identifies whether the protection process information in the remote operation packet matches the protection process information stored in the storage section 74 in the mobile terminal device 7.

When the identification result does not match (NO) in step S10, the mobile device terminal 7 waits for the identification of the protection process information and then, the information protection process system 1 ends and returns to the normal mode. On the other hand, when it is confirmed (matched) that the identification result is the predetermined protection mode information (YES) in step S10, the contents of information protection in the protection process information are analyzed in step S111.

The protection process information has codes which are pre-designated to each information protection process (the protection mode information and the protection process information are confirmed by matching the codes). The information protection processes include, for example, "warning generation", "message display", "sending function prohibition", "owner contacting", "stored data deletion", "data output prohibition", "communication line number obliteration", "stored data transfer", "user identification", and "power off". The information protection processes are branched off at predetermined codes, respectively, and proceed to individual information protection process routines.

For example, when it is confirmed that the contents of the protection process information matches the "warning generation" code (YES) in step S112, the process proceeds to step S113. The information protection process of the "warning generation", which generates an alarm to a visual sense or a hearing sense, is performed by the protection section 73. When a mismatch occurs (NO) in step S112, the process proceeds to the process in step S114 for the next process code, and performs each process if matched while searching for a matching code one after another. This is applied to the contents of other protection process information. When the contents of the protection process information match a predetermined code (YES), the corresponding information protection process is performed. When the contents of the protection process information do not match the predetermined process codes, the information protection process by the information protection process system 1 ends, or a fixed information protection process is performed by the information protection process system 1.

In step S114, it is identified whether the contents of the protection process information match the "message display" code. When the contents of the protection process information match the "message display" code (YES), the process proceeds to the process in step S115, and the information protection process of the "message display", which displays a contact address and/or a message previously input by the owner and stored in the storage section 74, is performed. When a mismatch occurs (NO) in step S114, the process proceeds to the process in step S116 for the next process code.

In step S116, it is identified whether the contents of the protection process information match the "sending function prohibition" code. When the contents of the protection process information match the "sending function prohibition" code (YES), the process proceeds to the process in step S117, and the information protection process of "sending function prohibition", which stops at least one function, previously input by the owner, of the original functions of the stolen or lost mobile terminal device 7, is performed. When a mismatch occurs (NO) in step S116, the process proceeds to the process in step S118 for the next process code.

As shown in FIG. 6B, in step S118, it is identified whether the contents of the protection process information match the "owner contacting" code. When the contents of the protection process information match the "owner contacting" code (YES), the process proceeds to the process in step S119, and the information protection process of "owner contacting", which sends a signal including predetermined contents to the contact address previously input by the owner and stored in the storage means, is performed. When a mismatch occurs (NO) in step S118, the process proceeds to the process in step S120 for the next process code.

In step S120, it is identified whether the contents of the protection process information match the "stored data deletion" code. When the contents of the protection process information match the "stored data deletion" code (YES), the process proceeds to the process in step S121, and the information protection process of the "stored data deletion", which deletes data stored in storage section 74 such that any person other than the owner cannot see and use the data stored in the storage section 74, is performed. When a mismatch occurs (NO) in step S120, the process proceeds to the process in step S122 for the next process code.

In step S122, it is identified whether the contents of the protection process information match the "data output prohibition" code. When the contents of the protection process information match the "data output prohibition" code (YES), the process proceeds to the process in step S123, and the information protection process of "data output prohibition", which prohibits a data output from the storage section 74, is performed. When a mismatch occurs (NO) in step S122, the process proceeds to the process in step S124 for the next process code.

In step S124, it is identified whether the contents of the protection process information match the "communication line number obliteration" code. When the contents of the protection process information match the "communication line number obliteration" code (YES), the process proceeds to the process in step S125, and the information protection process of the "communication line number obliteration", which obliterates a communication line number of the stolen or lost mobile terminal device 7 such that any person other than the owner cannot use the communication line number, is performed. When the mismatch occurs (NO) in step S124, the process proceeds to the process in step S126 for the next process code.

In step S126, it is identified whether the contents of the protection process information match the "stored data transfer" code. When the contents of the protection process information match the "stored data transfer" code (YES), the process proceeds to the process in step S127, and the information protection process of the "stored data transfer", which transfers a stored data in the storage section 74 so as to recover the stored data without leaving any data in the storage section 74, is performed. When the mismatch occurs (NO) in step S126, the process proceeds to the process in step S128 for the next process code.

In step S128, it is identified whether the contents of the protection process information match the "user identification" code. When the contents of the protection process information match the "user identification" code (YES), the process proceeds to the process in step S129, and the information protection process of "user identification", which identifies the user using the mobile terminal device 7 by using the identification section 72 such that any person other than the owner cannot use the mobile terminal device 7, is performed. When a mismatch occurs (NO) in step S128, the process proceeds to the process in step S130 for the next process code.

In step S130, it is identified whether the contents of the protection process information match the "power off" code. When the contents of the protection process information match the "power off" code (YES), the process proceeds to the process in step S131, and the information protection process of "power off", which stops the original functions of the stolen or lost mobile terminal device 7 such that any person other than the owner cannot use the mobile terminal device, is performed. When the mismatch occurs (NO) in step S130, the process proceeds to the process in step S132 for the next process code.

When the contents of the protection process information are a code which does not correspond to any one of the codes (YES) in step S132, the information protection process by the information protection process system lends. When the contents of the protection process information are not a code which does not correspond to anyone of the codes (NO) in step S132, the process procedds to the process in step S133. In step S133, the information protection process of, for example, the "power off" is performed as a fixed information protection process, and the information protection process by the information protection process system 1 ends.

As described above, in the lost mobile terminal device 7, the protection mode information and the protection process information which are predetermined between the mobile terminal device 7 and the management device 5 are stored in the storage section 74 in the mobile terminal device 7. For example, when the remote operation packet is transmitted using radiowave as a transmission medium and is received at the mobile terminal device 7, the protection process information, which is the identification result, is stored in the storage section 74. When a match between: the protection mode information and the protection process information previously stored in the storage means; and the protection mode information and the protection process information in the remote operation packet is confirmed, respectively, at least any one of the information protection processes as shown in FIG. 6 is performed. Furthermore, the state after the information protection process is performed is stored in an involatile storage means (e.g., involatile memory) provided in the storage section 74.

Owing to this, the following effects are obtained:

(1) It is possible to realize the information protection process for the lost mobile terminal device 7.

(2) It is possible to select and apply the most appropriate information protection process case by case (3) It is possible to maintain the state of the information protection even if the power of the mobile terminal device 7 is turned on again after the information protection process is performed.

The information protection processes by the protection section 73 in the lost mobile terminal device 7 shown in FIG. 6A and FIG. 6B are an example. When the mobile terminal device 7 is stolen or lost, based on the identification result of the remote operation packet which has been transmitted via communication means, in order to eliminate the possibility that the owner of the mobile terminal device 7 will incur any damages, the protection section 73 performs one or more of the following information protection processes:

(1) an information protection process of "power off" which stops the original function of the stolen or lost mobile terminal device such that any person other than the owner cannot use the mobile terminal device (steps S131 and S133 in FIG. 6B);

(2) an information protection process of "warning generation" which generates an alarm to a visual sense or a hearing sense when the any person other than the owner uses the stolen or lost mobile terminal device (step S113 in FIG. 6A);

(3) an information protection process of "message display" which displays a contact address or a message previously input by the owner and stored in the storage section 74, prevents a person who has picked up the mobile terminal device 7 and calls for the return of the mobile terminal device 7 to the owner so as to recover the mobile terminal device when the any person other than the owner uses the stolen or lost mobile terminal device 7;

(4) an information protection process of "owner contacting" which stops the original functions of the stolen or lost mobile terminal device 7 so as to perform a communication process only to the contact address previously input by the owner and stored in the storage section 74;

(5) an information protection process of "sending function prohibition" which performs a stopping process on at least one function, previously input by the owner, of the original functions of the stolen or lost mobile terminal device 7;

(6) an information protection process of "data output prohibition" which prohibits a data output from the storage section 74 in the stolen or the lost mobile terminal device 7;

(7) an information protection process of "stored data deletion" which deletes data from the storage section 74 in the stolen or the lost mobile terminal device 7 such that other people cannot see and use the data in the storage section 74;

(8) an information protection process of "communication line number obliteration" which obliterates a communication line number of the stolen or lost mobile terminal device 7 such that other people cannot use the communication line number;

(9) an information protection process of "stored data transfer" which transfers a stored data from the storage section 74 in the stolen or lost mobile terminal device 7 to another predetermined electronic device so as to recover the stored data without leaving any data in the storage section 74 (data movement); and

(10) an information protection process of "user identification" which identifies a user using the mobile terminal device 7 by the identification section 72 such that other people other than the owner cannot use the mobile terminal device (e.g., power off of the mobile terminal device).

When the mobile terminal device 7 is lost or stolen, based on the identification result by the identification section 72 in the remote operation packet which has been transmitted via communication means, in order to eliminate the possibility that any person, who has sent a ring signal to the mobile terminal device belonging to the owner, and the any person's information will incur any damages, the protection section 73 performs one or more of the following information protection processes:

(1) an information protection process of transmitting a predetermined information to any person, who have sent a ring signal to the mobile terminal device 7, that the owner of the mobile terminal device 7 is in a situation of not being able to receive;

(2) an information protection process of stopping a function of receiving an information being received from the any person who has sent a ring signal to the mobile terminal device 7;

(3) an information protection process of sending data used during a call or when in use to the any person who has sent a ring signal to the mobile terminal device 7;

(4) an information protection process of stopping a function of transmitting an information being transmitted to the any person who has sent a ring signal to the mobile terminal device 7, for example, without sending an access signal in a communication procedure operation;

(5) an information protection process of a loss message, previously input by the owner of the mobile terminal device and stored in the storage section 74, to the any person who has sent a ring signal to the mobile terminal device 7; and (6) an information protection process of preventing the any person, who has sent a ring signal to the mobile terminal device 7, from using the information protection system of the mobile terminal device 7.

Herein, a specific structural example of the mobile terminal device 7 shown in FIG. 1 will be described with reference to FIG. 7.

Figure 7:
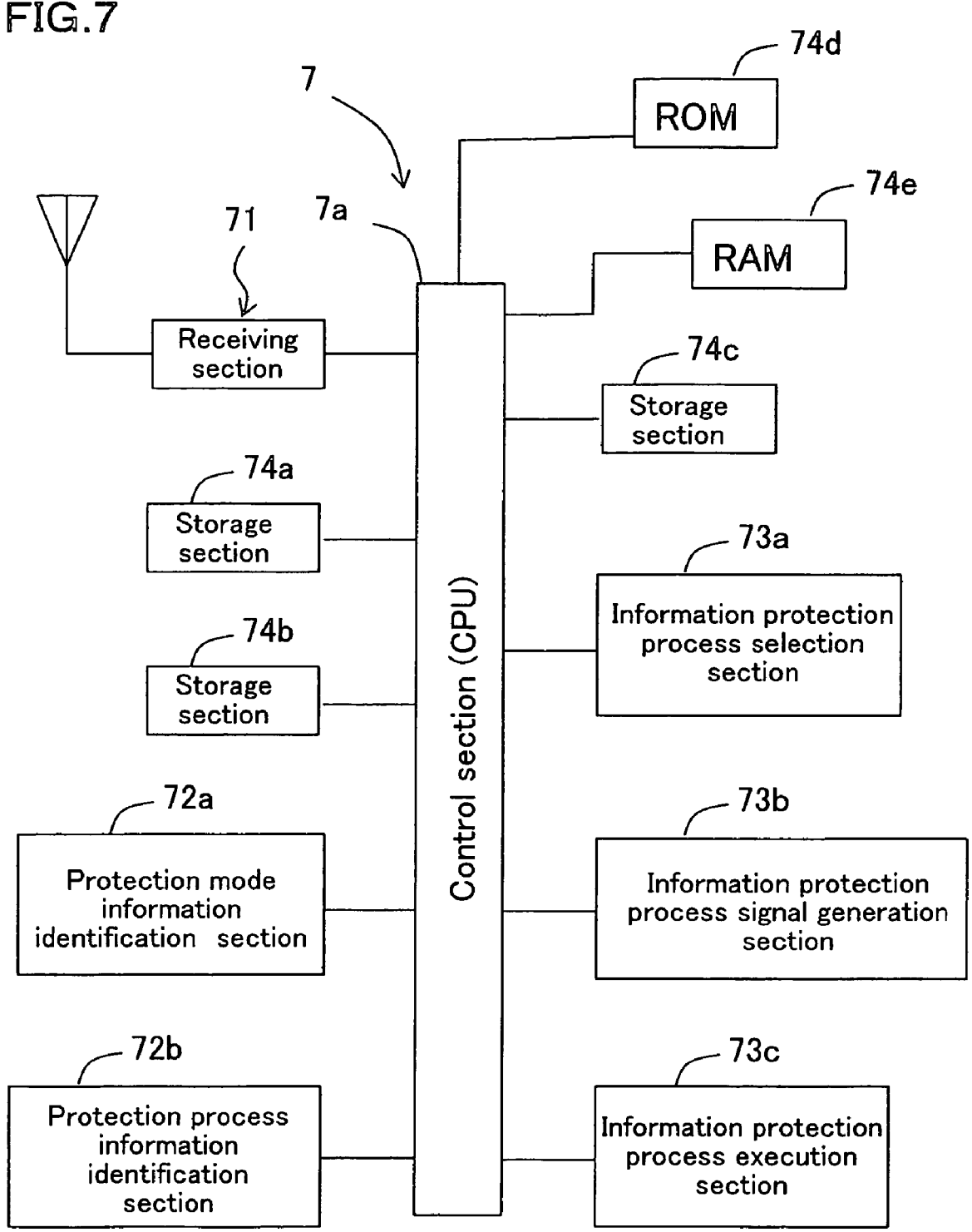
FIG. 7 is a block diagram showing a detailed structural example of the mobile terminal device shown in FIG. 1.

FIG. 7 is a block diagram showing a detailed structural example of the mobile terminal device 7 shown in FIG. 1.

In FIG. 7, the mobile terminal device 7 as an electronic device described above includes a receiving section 71, a protection mode information identification section 72a, a protection process information identification section 72b, a protection process selection section 73a, a protection process signal generation section 73b, an information protection process execution section 73c, a first storage section 74a, a second storage section 74b, a third storage section 74c, a ROM 74d, a RAM 74e and a control section (CPU; Central Processing Unit) 7a. The receiving section 71 receives a remote operation packet. The protection mode information identification section 72a identifies a protection mode information in the remote operation packet which has been received at the receiving section 71. The protection process information identification section 72b identifies the protection process information in the remote operation packet. The protection process selection section 73a selects an information protection process which corresponds to the information identified at the protection process information identification section 72b. The protection process signal generation section 73b generates a signal in accordance with the information protection process which has selected at the protection process selection section 73a. The information protection process execution section 73c receives the signal from the protection process signal generation section 73b and performs the information protection process in accordance with the signal. The first storage section 74*a* is provided as a first storage means for storing the protection mode information and the protection process information which are predetermined between the mobile terminal device 7 and the management device 5. The second storage section 74*b* is provided as a second storage means for storing the remote operation packet transmitted to the owner's mobile terminal device 7 from the management device 5 via the relay base station 6. The third storage section 74*c* is provided as a third storage means, which is involatile, for storing the state after the protection process is performed by the protection section 73*c*. The ROM 74*d* stores a control program and the data of the control program. The RAM 74*e* acts as a work memory. The control section 7*a* is connected to each section and performs the function of each section, based on the control program read into the RAM 74*e*.

The identification section 72 in FIG. 1 includes the protection mode information identification section 72*a*, the protection process information identification section 72*b* and the control section 7*a*. The protection section 73 includes the protection process selection section 73*a*, the protection process signal generation section 73*b*, the information protection process execution section 73*c* and the control section 7*a*. Furthermore, the storage section 74 as a computer-readable recording medium includes the first storage section 74*a*, the second storage section 74*b*, the third storage section 74*c*, the ROM 74*d* and the RAM 74*e*. The ROM 74*d* and the RAM 74*e* are computer-readable recording medium having the control program recorded thereon. The computer-readable recording medium can be configured by a variety of memory devices (e.g., hard disk, optical disk, magnetic disk, and IC memory).

Hereinafter, owing to the structure described above, each process operation of the mobile terminal device 7 will de described.

The remote operation packet (remote operation information) transmitted to the owner's mobile terminal device 7 from the management device 5 via the relay base station 6 is received at the receiving section 71, the remote operation packet is decoded by the control section 7*a* and then transmitted to the second storage section 74*b*. The transmitted data is stored in the second storage section 74*b*.

The protection mode information identification section 72*a* identifies whether the protection mode information stored in the first storage section 74*a* and the protection mode information stored in the second storage section 74*b* match each other. When each of the protection mode information matches each other, the protection process information identification section 72*b* identifies whether the protection process information stored in the first storage section 74*a* matches the protection process information stored in the second storage section 74*b*.

When each of the protection process information matches each other, an information protection process in accordance with the protection process information which is stored the second storage section 74*b* is selected by the protection process selection section 73*a*. After the information protection process is selected, a signal in accordance with the information protection process which is selected by the information protection process signal generation section 73*b* is generated, and then the signal is transmitted to the information protection process execution section 74*c*.

When the signal is received at the information protection process execution section 74*c*, the information protection process in accordance with the received signal is performed. After the information protection process is performed, the current state of the information protection after the information protection process is stored by the third storage section 74*c* such that the state returns to the current state and then resume the state after the power is turned on again.

Owing to the structure of the circuit block described above, it is possible to protect the owner's information of the stolen or lost mobile terminal device and the contactor's information. However, the structure of the circuit block is merely an example. As long as a similar function is realized, other methods can be used.

Figure 8:
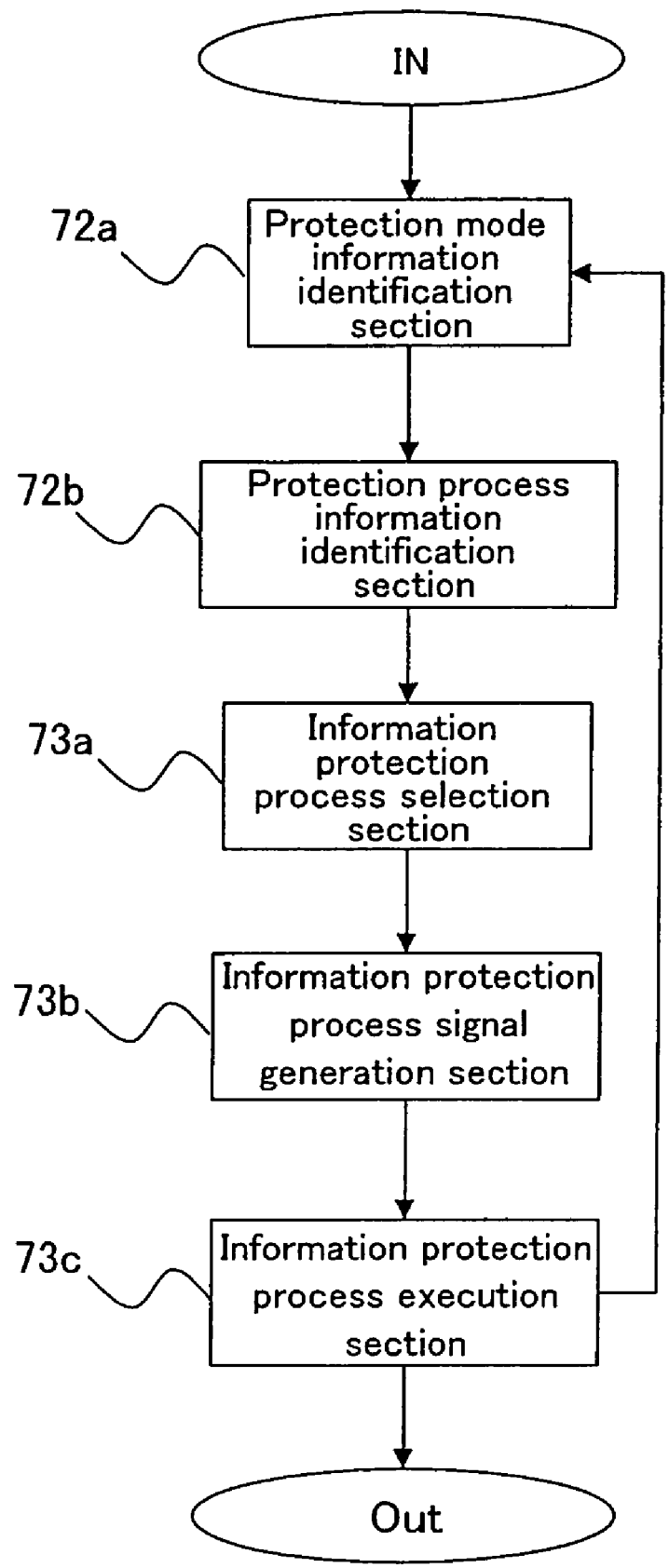
FIG. 8 is a flow diagram for explaining the flow of process data by the identification section and the protection section in the mobile terminal device shown in FIG. 1.
Figure 9:
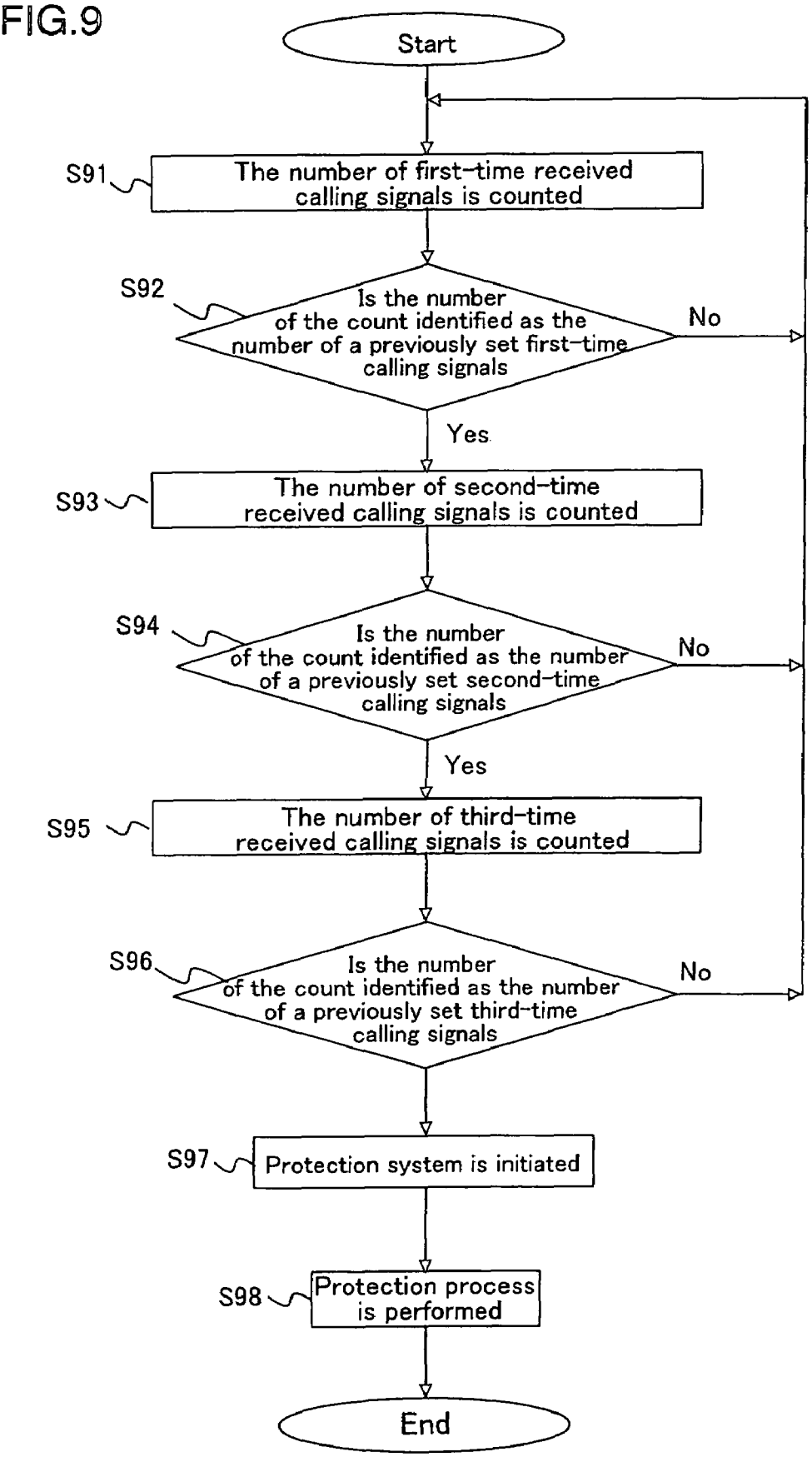
FIG. 9 is a flowchart for explaining a process procedure for a remote lock function in Reference 1.
Figure 10:
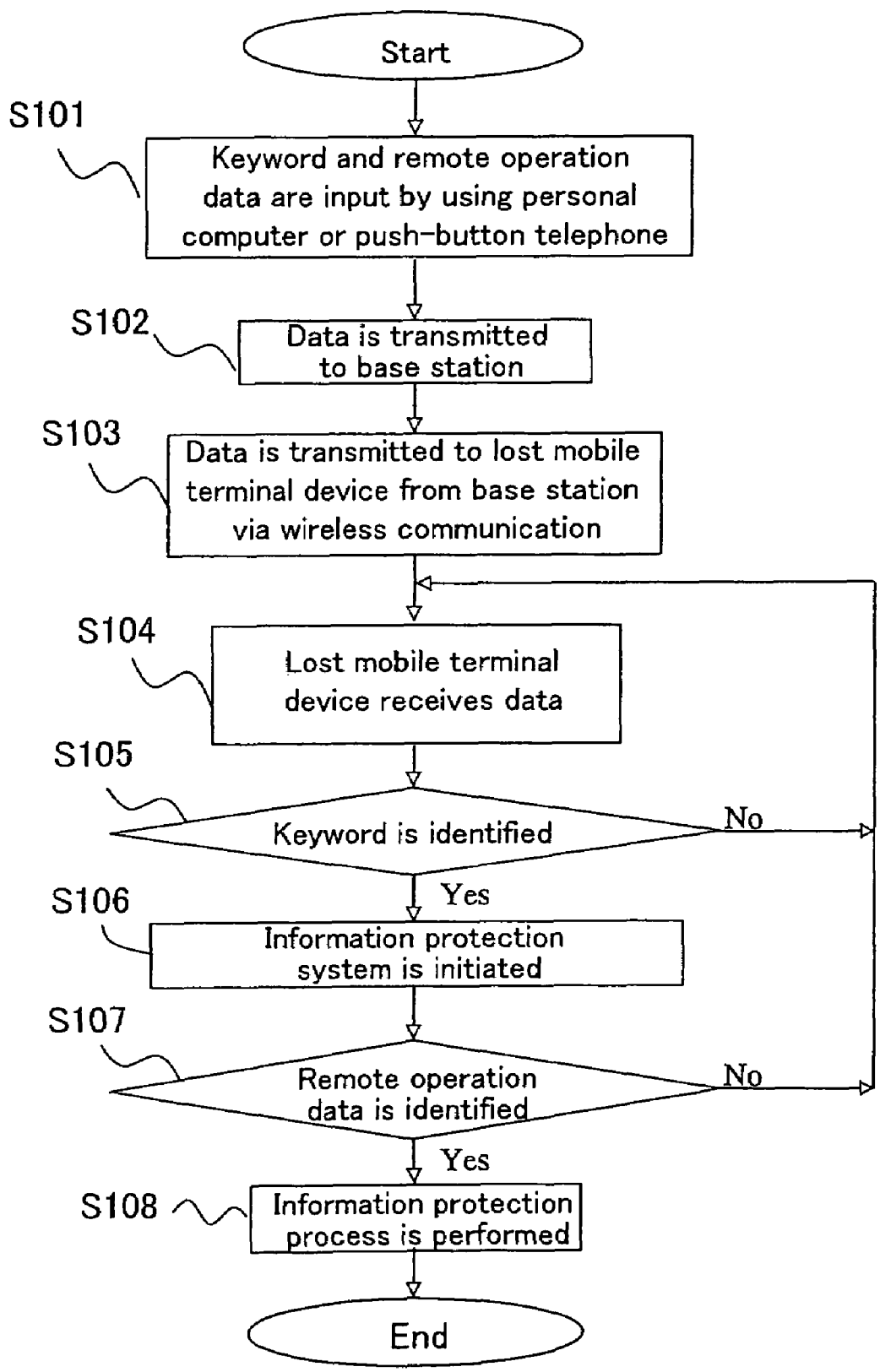
FIG. 10 is a flowchart for explaining the process procedure by a protection system for a mobile terminal device in Reference 2.

FIG. 8 is a flow diagram for explaining the flow of process data by the identification section and the protection section in the mobile terminal device shown in FIG. 7.

As shown in FIG. 8, when the remote operation packet, which is transmitted to the owner's mobile terminal device from the management 5 via the relay base station 6, is received at the mobile terminal device 7, a receiving completion signal reaches the protection mode identification section 72*a*. In the protection mode identification section 72*a*, it is identified whether the protection mode information in the transmitted remote operation packet matches the protection mode information in the first storage section 74*a*. When each of the protection mode information matches each other, the matched data is transmitted to the subsequent protection process information identification section 72*b* by the protection mode information identification section 72*a*.

In the protection process information identification section 72*b*, when the matched data is received from the protection mode identification section 72*a*, it is identified whether the protection process information in the remote operation packet matches the protection process information in the first storage section 74*a*. When it is identified that each of the protection process information is matched, the protection process information data is transmitted to the protection process selection section 73*a* from the protection process information identification section 72*b*.

In the protection process selection section 73*a*, a corresponding information protection process is selected from the protection process information data and then, the selected data for the corresponding information protection process is transmitted to the information protection process signal generation section 73*b*.

In the information protection process signal generation section 73*b*, an information protection process signal is generated based on the selected data, and then transmitted to the information protection process execution section 73*c*.

In the information protection process execution section 73*b*, the information protection process in accordance with the received information protection process signal is performed. After the information protection process is performed, an information protection process completion signal is transmitted to the protection mode identification 72*a* from the information protection process execution section 73*c*.

However, this data flow is merely an example. As long as a similar process is realized, other methods can be used.

As described above, according to the Embodiment, the information protection system 1 for the mobile terminal device includes: one or more relay base station 6 connected between the one or more relay base station 6 and the mobile terminal device 7 via radiowave communication means; an authentication device 4 for performing a person authentication process in order to identify whether a contactor is the owner of the mobile terminal device 7; a management device 5 for generating a remote operation packet in order to perform an information protection process on the mobile terminal device 7. When an information protection request is issued to the mobile terminal device 7, the person authentication process is performed by the authentication device 4. When the person authentication process is matched, the remote operation packet is generated by the management device 5 and is transmitted to the mobile terminal device 7 from the relay base station 6. The remote operation packet is received at the mobile terminal device 7, and then a predetermined information protection process in accordance with the received remote operation packet is performed. As a result, the information protection system 1 for the mobile terminal device, which can eliminate the possibility that the owner of the mobile terminal device will incur any damages against the theft and loss of the mobile terminal device 7 can be obtained with a small amount of labor and time.

Herein, Reference 2 and the present invention are compared. Although Reference 2 and the embodiment(s) of the present invention have a common objective in that they both protect a personal information in a wireless electric device (e.g., mobile telephone device), they have different information protection methods to achieve personal information protection. The reason that the embodiment(s) is (are) more effective than Reference 2 due to the difference in the information protection methods between Reference 2 and the present invention will be described in the following.

As an example of the reason, a situation, in which personal information accumulated (stored) in the mobile telephone device when the mobile telephone device is lost, considered. In Reference 2, a contactor (owner) contacting the lost mobile telephone device directly transmits a command for information protection to the lost mobile telephone device. This is performed by calling the lost mobile telephone device from a registered telephone device and issuing the command. However, in this case, it is impossible to issue the command when the lost mobile telephone device is located out of communication range. Thus, it is necessary for the contactor to repeatedly try to issue the command from the registered telephone device until the lost mobile device is moved within the communication range. As a result, a time-lag occurs since it takes time to protect the information which depends on the timing when the command for the information protection is issued.

According to the example information protection method (s) shown, a command for information protection (information protection request command) is transmitted once to a communication carrier (server) from the contactor's (owner) telephone device. The communication carrier automatically issues the information protection command (remote operation information) to the lost mobile terminal device (lost mobile telephone device). The advantage in this case is that the information protection command (remote operation information) is issued without any time loss or time-lag (i.e., immediately) to the lost mobile terminal device since the communication carrier always knows the communication status whether the lost mobile terminal device itself is located within the communication range or which cell (region) the lost mobile terminal device belongs to when it is located within the communication range.

Therefore, the degree of protection of the information in the embodiment(s) present invention is (are) far more superior than the conventional information protection method shown in Reference 2 when the mobile terminal device is lost. Thus, when the mobile terminal telephone device is stolen or lost, it is possible to more positively prevent an illegal use of the terminal telephone device and keep an individual's personal information stored in the mobile telephone device confidential.

In an example Embodiment, it is configured that the management device 5 includes: the management section 55 for managing a communication status with the mobile terminal device 7 and between the relay base station 6 and the mobile terminal device 7; and the confirmation section 56 for confirming whether the mobile terminal device 7 has received the remote operation packet based on the communication status managed by the management section 55. When the confirmation section 56 cannot confirm the receipt of the remote operation packet at the mobile terminal device 7, the management device 5 causes the packet transmission section 54 to perform a re-transmission (re-try) of the remote operation packet to the mobile terminal device 7. However, the embodiment is not limited to this. The management device 5 can include the management section 55 for managing the communication status between the mobile terminal device 7 and the relay base station 6. The relay base station 6 can further include a confirmation section for confirming whether the mobile terminal device 7 has received the remote operation packet. When the confirmation section cannot confirm the receipt of the remote operation packet at the mobile terminal device 7, this (i.e., the mobile terminal device 7 has not received the remote operation packet) can be transmitted to the management section 55 in the management device 5 from the relay base station 6, and then the management section 55 can cause the packet transmission section 54 to perform the re-transmission (re-try) of the remote operation packet to the mobile terminal device 7.

The control program (information protection process program in the mobile terminal device 7) writes each process procedure for causing a computer to read and execute the information protection method for the mobile terminal device 7. Thus, the control program can be stored in a computer-readable reading medium. Therefore, the information protection method for the mobile terminal device 7 can be controlled and executed by the computer. When the computer-readable information medium and the computer capable of reading and executing the control program from the computer-readable medium are mounted as an electronic information device, respectively, on the mobile terminal device 7 and the service server including the authentication 4 and the management device 5, the information protection system for the mobile terminal device 7 can be configured.

As described above, the present invention is exemplified by the use of its preferred embodiment(s). However, the present invention should not be interpreted solely based on the Embodiment described above. It is understood that the scope of the present invention should be interpreted solely based on the claims. It is also understood that those skilled in the art can implement equivalent scope of technology, based on the description of the present invention and common knowledge from the description of the detailed preferred Embodiment of the present invention. Furthermore, it is understood that any patent, any patent application and any references cited in the present specification should be incorporated by reference in the present specification in the same manneras the contents are specifically described therein.

INDUSTRIAL APPLICABILITY

In the field of: an information protection system for a mobile terminal device having, thereon, an information protection process function in order to enhance the security of information in the mobile terminal device when it is stolen or lost, the mobile terminal device being a data process terminal device including a communication means (e.g., PHS (Personal Handyphone System) and a mobile telephone device); an information protection method for the terminal mobile device; a control program having each process procedure written thereon for causing a computer to execute the method; a computer-readable medium having the control program written thereon; and an electric information device capable of executing the method by reading the control program from the computer-readable medium, the owner himself/herself operates a predetermined information protection means for eliminating the possibility that the owner of the mobile terminal device will incur any damages, by performing a remote operation for the theft or loss of the mobile terminal device, thereby enhancing the security of the owner's property or information of the mobile terminal device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information protection system for a mobile terminal device, the information protection system comprising:
   an authentication device for performing a person authentication process when an information protection request for the mobile terminal device is issued in order to identify whether any person being subjected to authentication is an owner of the mobile terminal device by using a personal identity information, the mobile terminal device being capable of performing a predetermined information protection process in accordance with a remote operation information; and
   a management device for generating the remote operation information in order to perform an information protection process for the mobile terminal device and for transmitting the remote operation information to the mobile terminal device when the person authentication process by the authentication process device matches the personal identity information,
   wherein the management device includes:
      a connection section ca able of receiving the information protection process instruction;
      a remote operation information generation section for generating the remote operation information based on a protection mode information and a protection process information when the information protection process instruction is received by the connection section in order to perform the information protection process for the mobile terminal device, the protection mode information and the protection process information being predetermined between the management device and the mobile terminal device; and
      a remote operation information transmission section for transmitting the remote operation information generated by the remote operation information generation section to the mobile terminal device.

2. An information protection system for a mobile terminal device according to claim 1, wherein the authentication device includes:
   a connection section capable of being connected to a communication section at a contactor's side;
   an authentication section for performing the person authentication process when the information protection request is connected by the connecting section in order to identify whether the contactor is the owner of the mobile terminal device by using the personal identity information; and
   an instruction output section for outputting an information protection process instruction to the management device when the person authentication process matches the personal identity information.

3. An information protection system for a mobile terminal device according to claim 2, wherein when the information protection request is issued, the information protection request being connected to the communication section on the contactor's side by the connection section, the authentication section compares:
   the personal identity information, provided by the contactor who responds to a question to the contact's side by using key numbers of the communication section, the question being issued through the communication section, and the question relates to at least one of a birth data or a PIN number, with the personal identity information previously stored so as to perform the person authentication process in order to identify whether the personal identity information matches each other.

4. An information protection system for a mobile terminal device according to claim 3, wherein the communication section is a mobile telephone device or a public telephone device.

5. An information protection system for a mobile terminal device according to claim 2, wherein the communication section is a mobile telephone device or a public telephone device.

6. An information protection system for a mobile terminal device according to claim 1, wherein the management device transmits the remote operation information to the mobile terminal device via a relay base station.

7. An information protection system for a mobile terminal device according to claim 6, wherein the management device includes a management section for managing a communication status between the mobile terminal device and the relay base station,
   wherein the relay base station includes a confirmation section for confirming whether the mobile terminal device has received the remote operation information,
   wherein when the confirmation section cannot confirm the receipt of the remote operation information at the mobile terminal device, the confirmation section transmits the information that the confirm section has not confirmed the management section in the management device from the relay base station, and the management device performs a re-transmission of the remote operation information to the mobile terminal device.

8. An information protection system for a mobile terminal device according to claim 1, wherein the management device includes:
   a management section for managing a communication status with the mobile terminal device; and
   a confirmation section for confirming whether the mobile terminal device has received the remote operation information based on the communication status managed by the management section,
   wherein the management section performs a re-transmission of the remote operation information to the mobile terminal device when the confirmation section cannot confirm the receipt of the remote operation information at the mobile terminal device.

9. An information protection system for a mobile terminal device according to claim 1, wherein the management device further includes a storage section for storing the protection mode information and the protection process information.

10. An information protection system for a mobile terminal device according to claim 1, wherein the management device transmits the remote operation information to the mobile terminal device via a relay base station.

11. An information protection system for a mobile terminal device according to claim 10, wherein the management device includes a management section for managing a communication status between the mobile terminal device and the relay base station, wherein the relay base station includes a confirmation section for confirming whether the mobile terminal device has received the remote operation information, wherein when the confirmation section cannot confirm the receipt of the remote operation information at the mobile terminal device, the confirmation section transmits the information that the confirm section has not confirmed to the management section in the management device from the relay base station, and the management device performs a re-transmission of the remote operation information to the mobile terminal device.

12. An information protection system for a mobile terminal device according to claim 1, wherein the management device includes:
- a management section for managing a communication status with the mobile terminal device; and
- a confirmation section for confirming whether the mobile terminal device has received the remote operation information based on the communication status managed by the management section,
- wherein the management section performs a re-transmission of the remote operation information to the mobile terminal device when the confirmation section cannot confirm the receipt of the remote operation information at the mobile terminal device.

13. An information protection system for a mobile terminal device according to claim 1, wherein the mobile terminal device includes:
- a receiving section for receiving the remote operation information to be transmitted;
- an identification section for identifying the received remote operation information; and
- an information protection process section for performing the predetermined information protection process in accordance with the remote operation information based on the identification result by the identification section.

14. An information protection system for a mobile terminal device according to claim 13, wherein the mobile terminal device further includes a storage section for storing a predetermined information, the predetermined information being predetermined between the mobile terminal device and the management device.

15. An information protection system for a mobile terminal device according to claim 14, wherein the identification section includes:
- a protection mode information identification section for identifying whether a protection mode information stored as the predetermined information in the storage section matches a protection mode information in the remote operation information; and
- a protection process information identification section for identifying whether a protection process information stored as a predetermined information in the storage section matches a protection process information in the remote operation information.

16. An information protection system for a mobile terminal device according to claim 14, wherein the storage section includes:
- a first storage section for storing a protection mode information and a protection process information;
- a second storage section for storing the remote operation information received by the receiving section; and
- a third storage section for storing a state after the information protection process is performed by the information protection process section, the information protection process being performed after a match between the protection mode information stored in the first storage section and the protection mode information stored in the second storage section is confirmed by the identification section.

17. An information protection system for a mobile terminal device according to claim 13, wherein the information protection process section performs the predetermined information protection process in order to eliminate the possibility that the owner of the mobile terminal device will incur any damages based on the identification result of the transmitted remote operation information when the mobile terminal device is stolen or lost.

18. An information protection system for a mobile terminal device according to claim 17, wherein the information protection process section performs the predetermined information protection process in order to eliminate the possibility that any person who has sent a ring signal to the owner of the mobile terminal device will incur any damages based on the identification result of the transmitted remote operation information when the mobile terminal device is stolen or lost.

19. An information protection system for a mobile terminal device according to claim 18, wherein the information protection process section performs at least one of the following information protection processes:
- (1) an information protection process of transmitting a predetermined information to any person, who has sent a ring signal to the mobile terminal device, that the owner of the mobile terminal device is in a situation of not being able to receive;
- (2) an information protection process of stopping a function of receiving an information being received from the any person who has sent a ring signal to the mobile terminal device;
- (3) an information protection process of transmitting data used during a call or when in use to the any person who has sent a ring signal to the mobile terminal device;
- (4) an information protection process of stopping a function of transmitting an information being transmitted to the any person who has sent a ring signal to the mobile terminal device;
- (5) an information protection process of transmitting a loss message, previously input by the owner of the mobile terminal device and stored in the storage section, to the any person who has sent a ring signal to the mobile terminal device; and
- (6) an information protection process of preventing the any person, who has sent a ring signal to the mobile terminal device, from using the information protection system of the mobile terminal device.

20. An information protection system for a mobile terminal device according to claim 17, wherein the information protection process section performs at least one of the following information protection processes:
- (1) an information protection process of "power off" which stops the original functions of the stolen or lost mobile terminal device such that any person other than the owner cannot use the mobile terminal device;
- (2) an information protection process of "warning generation" which generates an alarm to a visual sense or a hearing sense when the any person other than the owner uses the stolen or lost mobile terminal device;
- (3) an information protection process of "message display" which displays, on a predetermined display section, a contact address or a message previously input by the owner and stored in the storage section so as to recover the mobile terminal device when the any person other than the owner uses the stolen or lost mobile terminal device;

(4) an information protection process of "owner contacting" which stops the original functions of the stolen or lost mobile terminal device so as to perform a communication process only to the contact address previously input by the owner and stored in the storage section;

(5) an information protection process of "sending function prohibition" which performs a stopping process on at least one of the original functions, previously input by the owner, of the stolen or lost mobile terminal device;

(6) an information protection process of "data output prohibition" which prohibits a data output from the storage section in the stolen or the lost mobile terminal device;

(7) an information protection process of "stored data deletion" which deletes data from the storage section in the stolen or the lost mobile terminal device such that any person other than the owner cannot see and use the data;

(8) an information protection process of "communication line number Obliteration" which obliterates a communication line number of the stolen or lost mobile terminal device such that the any person other than the owner cannot use the communication line number;

(9) an information protection process of "stored data transfer" which transfers a stored data from the storage section in the stolen or lost mobile terminal device to another predetermined electronic device so as to recover the stored data; and

(10) an information protection process of "user identification" which identifies a user using the mobile terminal device by the identification section such that the any person other than the owner cannot use the mobile terminal device.

21. An information protection system for a mobile terminal device according to claim 13, wherein the information protection process section performs the predetermined information protection process in order to eliminate the possibility that any person who has sent a ring signal to the owner of the mobile terminal device will incur any damages based on the identification result of the transmitted remote operation information when the mobile terminal device is stolen or lost.

22. An information protection system for a mobile terminal device according to claim 21, wherein the information protection process section performs at least one of the following information protection processes:

(1) an information protection process of transmitting a predetermined information to any person, who has sent a ring signal to the mobile terminal device, that the owner of the mobile terminal device is in a situation of not being able to receive;

(2) an information protection process of stopping a function of receiving an information being received from the any person who has sent a ring signal to the mobile terminal device;

(3) an information protection process of transmitting data used during a call or when in use to the any person who has sent a ring signal to the mobile terminal device;

(4) an information protection process of stopping a function of transmitting an information being transmitted to the any person who has sent a ring signal to the mobile terminal device;

(5) an information protection process of transmitting a loss message, previously input by the owner of the mobile terminal device and stored in the storage section, to the any person who has sent a ring signal to the mobile terminal device; and (6) an information protection process of preventing the any person, who has sent a ring signal to the mobile terminal device, from using the information protection system of the mobile terminal device.

23. An information protection method for a mobile terminal device, the mobile terminal device performing an information protection process by using the information protection system for the mobile terminal device according to claim 1, the method causing a server to perform the following based on a computer control program:

an authentication step of performing a person authentication process when an information protection request for the mobile terminal device is issued from a communication section at a contactor's side; and a management step of generating a remote operation information and transmitting the remote operation information to the mobile terminal device when the person authentication process matches a personal identity information, the method causing the mobile terminal device to perform the following based on the computer control program:

an identification step of receiving the remote operation information from the server and identifying the received remote operation information; and a step of performing a predetermined information protection process in accordance with the remote operation information based on the identification result in the identification step, wherein the management step is performed by a management device, the management step comprising:

receiving the information protection process instruction;

generating the remote operation information based on protection mode information and a protection process information when the information protection process instruction is received in order to perform the information protection process for the mobile terminal device, wherein the protection mode information and the protection process information are predetermined between the mobile terminal device and the server; and transmitting the remote operation information to the mobile terminal device.

24. An information protection method for a mobile terminal device according to claim 23, wherein the authentication step includes:

a step of performing a person authentication process for identifying, by using the personal identity information, whether the contactor is the owner of the mobile terminal device when the information protection request is issued; and an instruction output step of outputting an information protection process instruction when the person authentication process matches the personal identity information.

25. An information protection method for a mobile terminal device according to claim 23, wherein the management step includes:

a remote operation information generation step of generating a remote operation information in order to perform the information protection process for the mobile terminal device when the information protection process instruction is received; and a remote operation information transmission step of transmitting the generated remote operation information to the mobile terminal device.

26. An information protection method for a mobile terminal device according to claim 25, wherein the management step includes:
a management step of managing a communication status with the mobile terminal device; and
a confirmation step of confirming whether the mobile terminal device has received the remote operation device based on the communication status,
wherein the management step performs a re-transmission of the remote operation information to the mobile terminal device when the receipt of the remote operation information at the mobile terminal device cannot be confirmed in the confirmation step.

27. An information protection method for a mobile terminal device according to claim 23, wherein the management step includes:
a management step of managing a communication status with the mobile terminal device; and
a confirmation step of confirming whether the mobile terminal device has received the remote operation device based on the communication status,
wherein the management step performs a re-transmission of the remote operation information to the mobile terminal device when the receipt of the remote operation information at the mobile terminal device cannot be confirmed in the confirmation step.

28. An information protection method for a mobile terminal device according to claim 23, wherein the identification step includes:
a protection mode information identification step of identifying whether a stored protection mode information matches a protection mode information in the remote operation information; and
a protection process information identification step of identifying whether a stored protection process information matches a protection process information in the remote operation information.

29. An information protection method for a mobile terminal device according to claim 23, wherein the remote operation information is provided in a remote operation packet in which the protection mode information and the protection process information are respectively included in a header section and a data section of the packet.

30. An information protection system for a mobile terminal device according to claim 1, wherein the remote operation information is provided in a remote operation packet in which the protection mode information and the protection process information are respectively included in a header section and a data section of the packet.

31. An information protection method for a mobile terminal device, the method causing an information protection system to perform the following based on a computer control program:
an authentication step of performing a person authentication process when an information protection request for the mobile terminal device is issued; and
a management step of generating a remote operation information and transmitting the remote operation information to the mobile terminal device when the person authentication process matches a personal identity information,
wherein the management step is performed by a management device, the management step comprising:
receiving the information protection process instruction;
generating the remote operation information based on a protection mode information and a protection process information when the information protection process instruction is received in order to perform the information protection process for the mobile terminal device, wherein the protection mode information and the protection process information are predetermined between the mobile terminal device and the information protection system; and
transmitting the remote operation information to the mobile terminal device.

32. An information protection method for a mobile terminal device according to claim 31, wherein the authentication step includes:
a step of performing a person authentication process for identifying, by using the personal identity information, whether the contactor is the owner of the mobile terminal device when the information protection request is issued; and
an instruction output step of outputting an information protection process instruction when the person authentication process matches the personal identity information.

33. An information protection method for a mobile terminal device according to claim 31, wherein the management step includes:
a remote operation information generation step of generating a remote operation information in order to perform the information protection process for the mobile terminal device when the information protection process instruction is received; and
a remote operation information transmission step of transmitting the generated remote operation information to the mobile terminal device.

34. An information protection method for a mobile terminal device according to claim 33, wherein the management step includes:
a management step of managing a communication status with the mobile terminal device; and
a confirmation step of confirming whether the mobile terminal device has received the remote operation device based on the communication status,
wherein the management step performs a re-transmission of the remote operation information to the mobile terminal device when the receipt of the remote operation information at the mobile terminal device cannot be confirmed in the confirmation step.

35. An information protection method for a mobile terminal device according to claim 31, wherein the management step includes:
a management step of managing a communication status with the mobile terminal device; and
a confirmation step of confirming whether the mobile terminal device has received the remote operation device based on the communication status,
wherein the management step performs a re-transmission of the remote operation information to the mobile terminal device when the receipt of the remote operation information at the mobile terminal device cannot be confirmed in the confirmation step.

36. An information protection method for a mobile terminal device according to claim 31, wherein the remote operation information is provided in a remote operation packet in which the protection mode information and the protection process information are respectively included in a header section and a data section of the packet.

37. An information protection method for a mobile terminal device, the method causes an information protection system to perform the following based on a computer control program:

an identification step of receiving a remote operation information and identifying the received remote operation information; and a step of performing a predetermined information protection process in accordance with the remote operation information based on the identification result in the identification step, wherein the remote operation information is generated by a management device performing a method comprising the steps of:

receiving the information protection process instruction;

generating the remote operation information based on a protection mode information and a protection process information when the information protection process instruction is received in order to perform the information protection process for the mobile terminal device, the protection mode information and the protection process information being predetermined between the mobile terminal device and the management device arranged to generate the remote operation information; and transmitting the remote operation information to the mobile terminal device.

38. An information protection method for a mobile terminal device according to claim 37, wherein the identification step includes:

a protection mode information identification step of identifying whether a stored protection mode information matches a protection mode information in the remote operation information; and a protection process information identification step of identifying whether a stored protection process information matches a protection process information in the remote operation information.

39. An information protection method for a mobile terminal device according to claim 37, wherein the remote operation information is provided in a remote operation packet in which the protection mode information and the protection process information are respectively included in a header section and a data section of the packet.

40. An electronic information device, comprising:

an authentication section for performing a person authentication process when an information protection request for a mobile terminal device is issued; and a section for generating a remote operation information and transmitting the remote operation information to the mobile terminal device when the person authentication process matches a personal identity information, wherein the section for generating the remote operation information comprises:

a connection section capable of receiving the information protection process instruction;

a remote operation information generation section for generating the remote operation information based on a protection mode information and a protection process information when the information protection process instruction is received by the connection section in order to perform the information protection process for the mobile terminal device, wherein the protection mode information and the protection process information are predetermined between the management device and the mobile terminal device; and a remote operation information transmission section for transmitting the operation information generated by the remote operation information generation section to the mobile terminal device.

41. An electronic information device according to claim 40, wherein the remote operation information is provided in a remote operation packet in which the protection mode information and the protection process information are respectively included in a header section and a data section of the packet.

42. An electronic information device, comprising:

an identification section for receiving a remote operation information and identifying the received remote operation information; and a section for performing a predetermined information protection process in accordance with the remote operation information based on the identification result by the identification section, wherein the remote operation information is generated by a management device comprising:

a connection section capable of receiving the information protection process instruction;

a remote operation information generation section for generating the remote operation information based on a protection mode information and a protection process information when the information protection process instruction is received by the connection section in order to perform the information protection process for the mobile terminal device, the protection mode information and the protection process information being predetermined between the electronic information device and the management device providing the remote operation information to the electronic device; and a remote operation information transmission section for transmitting the remote operation information generated by the remote operation information generation section to the mobile terminal device.

43. An electronic information device according to claim 42, wherein the remote operation information is provided in a remote operation packet in which the protection mode information and the protection process information are respectively included in a header section and a data section of the packet.

* * * * *